United States Patent
Yamamoto

(10) Patent No.: US 9,207,781 B2
(45) Date of Patent: Dec. 8, 2015

(54) INPUT APPARATUS, CONTROL SYSTEM, HANDHELD APPARATUS, AND CALIBRATION METHOD

(75) Inventor: Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1390 days.

(21) Appl. No.: 12/474,967

(22) Filed: May 29, 2009

(65) Prior Publication Data

US 2009/0295722 A1  Dec. 3, 2009

(30) Foreign Application Priority Data

Jun. 2, 2008  (JP) ................................. 2008-144253
Dec. 26, 2008  (JP) ................................. 2008-332415

(51) Int. Cl.
  *G06F 3/0346*  (2013.01)
(52) U.S. Cl.
  CPC .................................. *G06F 3/0346* (2013.01)
(58) Field of Classification Search
  CPC .......... G06F 2203/0381; G06F 3/0312; G06F 3/0325
  USPC ......................................... 345/158, 157, 156
  See application file for complete search history.

(56) References Cited

U.S. PATENT DOCUMENTS

| | | | | |
|---|---|---|---|---|
| 5,825,350 A | * | 10/1998 | Case et al. | 345/163 |
| 7,672,806 B2 | * | 3/2010 | Tronconi et al. | 702/141 |
| 8,250,921 B2 | * | 8/2012 | Nasiri et al. | 73/511 |
| 2004/0158175 A1 | * | 8/2004 | Ikeuchi et al. | 601/5 |
| 2004/0210411 A1 | * | 10/2004 | Koo et al. | 702/104 |
| 2006/0104620 A1 | * | 5/2006 | Ebato | 396/55 |
| 2008/0158154 A1 | * | 7/2008 | Liberty et al. | 345/158 |
| 2008/0158155 A1 | * | 7/2008 | Liberty et al. | 345/158 |
| 2008/0223107 A1 | * | 9/2008 | Stewart | 73/1.38 |

FOREIGN PATENT DOCUMENTS

| | | |
|---|---|---|
| JP | 10-301704 | 11/1998 |
| JP | 2001-56743 | 2/2001 |

\* cited by examiner

*Primary Examiner* — William Boddie
*Assistant Examiner* — Jeffrey A Parker
(74) *Attorney, Agent, or Firm* — K & L Gates

(57) ABSTRACT

An input apparatus includes a casing, an output section, a processing section, a judgment section, and a calibration section. The output section includes a reference potential and outputs, as a detection signal, a fluctuation of a potential with respect to the reference potential, that corresponds to a movement of the casing. The processing section executes processing for generating a control command for controlling a screen based on an output value of the output section. The judgment section judges an operational state of the input apparatus. The calibration section executes, when it is judged that the input apparatus is moving, a calibration mode as processing for correcting the reference potential by obtaining the output value over a data obtainment period that is a sampling period of the output value and calculating a correction value of the reference potential based on the obtained output value.

22 Claims, 20 Drawing Sheets

INPUT APPARATUS, CONTROL SYSTEM, HANDHELD APPARATUS, AND CALIBRATION METHOD

CROSS REFERENCES TO RELATED APPLICATIONS

The present application claims priority to Japanese Priority Patent Application JP 2008-144253 filed in the Japan Patent Office on Jun. 2, 2008 and Japanese Priority Patent Application JP 2008-332415 filed in the Japan Patent Office on Dec. 26, 2008, the entire contents of which is hereby incorporated by reference.

BACKGROUND

The present application relates to a 3-dimensional operation input apparatus for operating, for example, a GUI (Graphical User Interface), a control system, a handheld apparatus, and a calibration method.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Japanese Patent Application Laid-open No. 2001-56743 and Japanese Patent Application Laid-open No. Hei 10-301704; hereinafter, referred to as Patent Documents 1 and 2, respectively).

Patent Document 1 discloses an input apparatus including angular velocity gyroscopes of two axes, that is, two angular velocity sensors. When a user holds the input apparatus in hand and swings it vertically and laterally, for example, the angular velocity sensors detect angular velocities about two orthogonal axes, and a command signal as positional information of a cursor or the like displayed by a display means is generated in accordance with the angular velocities. The command signal is transmitted to a control apparatus, and the control apparatus controls display so that the cursor moves on a screen in response to the command signal.

Patent Document 2 discloses a pen-type input apparatus including three (triaxial) acceleration sensors and three (triaxial) angular velocity sensors (gyro). The pen-type input apparatus calculates movement directions and movement distances thereof by executing various operations based on signals obtained by the three acceleration sensors and three angular velocity sensors.

Incidentally, the input apparatuses of Patent Documents 1 and 2 use gyro sensors and acceleration sensors that detect, instead of directly detecting displacements, inertial amounts using dimensions of displacements obtained by temporally differentiating angular velocities, accelerations, and the like. The angular velocity sensors and the acceleration sensors each output a fluctuation of a potential with respect to a reference potential, that corresponds to a movement of the input apparatus, as a detection signal. Based on the output detection signal, a command signal including, for example, a position, a movement amount, and a movement velocity is generated.

Meanwhile, because the inertial sensors above detect a movement operation of the input apparatus based on the fluctuation of the potential with respect to the reference potential, when the reference potential is deviated, an inconvenience that a cursor moves at a constant velocity or a constant acceleration irrespective of the fact that the input apparatus is stopped is caused. The deviation of the reference potential is caused by, for example, temperature characteristics of piezoelectric devices and analog circuit devices.

To eliminate unintentional movements of the cursor due to the deviation of the reference potential, the reference potential needs to be corrected periodically or unperiodically. For example, U.S. Pat. No. 5,825,350 (hereinafter, referred to as Patent Document 3) discloses a technique in which a reference potential of a gyro sensor is corrected when an output of the gyro sensor is equal to or smaller than a predetermined threshold value.

SUMMARY

In a calibration method disclosed in Patent Document 3, a calibration is started as long as a certain condition is satisfied during an operation of an input apparatus. Therefore, there are cases where, while a user is moving the input apparatus slowly in one direction at approximately a constant velocity, the correction of the reference potential is executed with an output value of the gyro sensor at this time as a reference. In this case, the cursor moves on its own in a direction opposite to the one direction even when the movement of the input apparatus is stopped, which is inconvenient.

Meanwhile, it is possible to solve the above problem by strictly setting a threshold value for a sensor output that is to be a reference for starting the calibration. However, if the threshold value is set strictly, there is a fear that, due to noises and minute vibrations in the environment, an inconvenience that an operational mode cannot be shifted to a calibration mode even though the input apparatus is not actually operated or is in a static state, may be newly caused.

In view of the circumstances as described above, there is a need for an input apparatus, a control system, a handheld apparatus, and a calibration method that are capable of appropriately calibrating a sensor.

According to an embodiment, there is provided an input apparatus including a casing, an output means, a processing means, a judgment means, and a calibration means.

The output means includes a reference potential and outputs, as a detection signal, a fluctuation of a potential with respect to the reference potential, that corresponds to a movement of the casing.

The processing means executes processing for generating a control command for controlling a screen based on an output value of the output means.

The judgment means judges an operational state of the input apparatus.

The calibration means executes, when it is judged by the judgment means that the input apparatus is moving, a calibration mode as processing for correcting the reference potential by obtaining the output value over a data obtainment period that is a sampling period of the output value and calculating a correction value of the reference potential based on the obtained output value.

Whereas a time required for correcting the reference potential can be made shorter as the data obtainment period becomes shorter, high calibration accuracy is difficult to be obtained. Also, whereas the calibration accuracy can be improved as the data obtainment period is prolonged, a time required for the calibration is elongated. The former case is effective when a movement of the input apparatus is relatively large, whereas the latter case is effective when the movement of the input apparatus is relatively slow, for example. On the other hand, when the input apparatus is in a static state where the input apparatus is not operated by a user like when the input apparatus is placed on a table, high calibration accuracy can be obtained even when the data obtainment period is short, and the calibration can be carried out in a short time.

According to the input apparatus, by appropriately setting the data obtainment period, the sensor can be calibrated appropriately also when it is judged that the input apparatus is moving.

The input apparatus may further include a setting means for setting the calibration mode executed by the calibration means based on the operational state of the input apparatus judged by the judgment means. The setting means sets the data obtainment period of the calibration mode based on the operational state of the input apparatus judged by the judgment means.

Accordingly, the reference potential of the output means can be corrected appropriately even during an operation of the input apparatus.

The judgment means may judge the operational state of the input apparatus based on the output value.

Accordingly, the output means can be calibrated under an optimal calibration condition according to the operational state of the input apparatus.

The setting means may set a shorter time period for the data obtainment period as the output value becomes smaller.

Accordingly, a highly-reliable calibration can be realized.

It is also possible that the calibration means does not execute the calibration mode when a change amount of the output value exceeds a predetermined threshold value.

Accordingly, an inconvenience due to a calibration that is based on an excessively-large output value can be eliminated.

The output means may include an angular velocity sensor to detect an angular velocity that acts on the casing. In this case, the judgment means judges the operational state of the input apparatus based on an output value of the angular velocity sensor, and the calibration means corrects a reference potential of the angular velocity sensor using the output value of the angular velocity sensor obtained over the data obtainment period.

Accordingly, the reference potential of the angular velocity sensor can be corrected appropriately.

The calibration means may include a lowpass filter to extract a signal of a predetermined frequency band from a detection signal of the angular velocity sensor. In this case, the data obtainment period is set based on a cutoff frequency of the lowpass filter.

Accordingly, the setting of the data obtainment period can be optimized.

The output means may include an angular velocity sensor to detect an angular velocity that acts on the casing and an acceleration sensor to detect an acceleration that acts on the casing. In this case, the judgment means judges the operational state of the input apparatus based on an output value of the acceleration sensor, and the calibration means corrects a reference potential of the angular velocity sensor using an output value of the angular velocity sensor obtained over the data obtainment period.

Accordingly, the reference potential of the angular velocity sensor can be corrected appropriately.

The judgment means may judge the operational state of the input apparatus based on a lapse time since an activation of the input apparatus.

Accordingly, the fluctuation of the reference potential due to an activation drift of the input apparatus can be suppressed.

The setting means may set a longer time period for the data obtainment period depending on the lapse time since the activation of the input apparatus.

Accordingly, the reference potential can be corrected appropriately following a temporal change in the activation drift.

The processing means may execute processing in which the generation of the control command is stopped when a difference between the output value of the output means and the correction value of the reference potential is equal to or smaller than a predetermined value.

Accordingly, lowering of operability due to a difference between the corrected reference potential and the actual reference potential can be suppressed.

The processing means may decrement the predetermined value every time the reference potential is corrected.

Accordingly, it becomes possible to correct an adverse effect incurred when a dead band area is provided to the input apparatus and thus improve operability.

The processing means may include a first processing mode as processing for generating the control command for controlling the screen based on the output value of the output means, and a second processing mode as processing in which the control of the screen is stopped. In this case, the judgment means judges that the operational state is a screen-controlled state when the processing means is executing the first processing mode, and judges that the operational state is a screen-uncontrolled state when the processing means is executing the second processing mode.

Accordingly, it becomes possible to execute highly-accurate calibration processing in accordance with the difference between the screen-controlled state and the screen-uncontrolled state.

The setting means may set a first time period for the data obtainment period when the judgment means judges that the operational state is the screen-controlled state, and set a second time period shorter than the first time period for the data obtainment period when the judgment means judges that the operational state is the screen-uncontrolled state.

Accordingly, appropriate calibration processing can be executed in both the screen-controlled state and the screen-uncontrolled state.

The input apparatus may further include a selection switch for causing the processing means to select one of the first processing mode and the second processing mode.

Accordingly, the screen-controlled state and the screen-uncontrolled state can be discriminated accurately.

The setting means may include processing for changing the second time period in accordance with a magnitude of the output value.

Accordingly, it becomes possible to execute appropriate calibration processing that corresponds to the operational state of the input apparatus.

According to an embodiment, there is provided a control system including an input apparatus and a control apparatus.

The input apparatus includes a casing, an output means, a processing means, a transmission means, a judgment means, and a calibration means.

The output means includes a reference potential and outputs, as a detection signal, a fluctuation of a potential with respect to the reference potential, that corresponds to a movement of the casing. The processing means executes processing for generating a control command for controlling a screen based on an output value of the output means. The transmission means transmits the control command generated by the processing means. The judgment means judges an operational state of the input apparatus. The calibration means executes, when it is judged by the judgment means that the input apparatus is moving, a calibration mode as processing for correcting the reference potential by obtaining the output value over a data obtainment period that is a sampling period of the output value and calculating a correction value of the reference potential based on the obtained output value.

The control apparatus includes a reception means and a display control means. The reception means receives the control command transmitted by the transmission means. The display control means controls display of the screen in response to the control command received by the reception means.

Accordingly, the reference potential of the output means can be corrected appropriately even during an operation of the input apparatus.

According to an embodiment, there is provided a handheld apparatus including a casing, a display section, an output means, a processing means, a judgment means, and a calibration means.

The output means includes a reference potential and outputs, as a detection signal, a fluctuation of a potential with respect to the reference potential, that corresponds to a movement of the casing.

The processing means executes processing for generating a control command for controlling a screen displayed on the display section based on an output value of the output means.

The judgment means judges an operational state of the handheld apparatus.

The calibration means executes, when it is judged by the judgment means that the handheld apparatus is moving, a calibration mode as processing for correcting the reference potential by obtaining the output value over a data obtainment period that is a sampling period of the output value and calculating a correction value of the reference potential based on the obtained output value.

Accordingly, the reference potential of the output means can be corrected appropriately even during an operation of the handheld apparatus.

According to an embodiment, there is provided a calibration method including outputting, as a detection signal, a fluctuation of a potential with respect to a reference potential, that corresponds to a movement of a casing of an electronic apparatus. When it is judged that the electronic apparatus is moving as a result of judging an operational state thereof, an output value of the detection signal is obtained over a data obtainment period that is a sampling period of the output value, and a correction value of the reference potential is calculated based on the obtained output value. The reference potential is updated using the calculated correction value.

Accordingly, the reference potential can be corrected appropriately even during an operation of the electronic apparatus.

As described above, according to the embodiments, a reference potential of a sensor can be corrected appropriately.

Additional features and advantages are described in, and will be apparent from, the following Detailed Description and the figures.

DETAILED DESCRIPTION

The present application will be described below in greater detail with reference to the drawings according to an embodiment.

[First Embodiment]

First, a first embodiment will be described.

(Control System)

Figure 1:
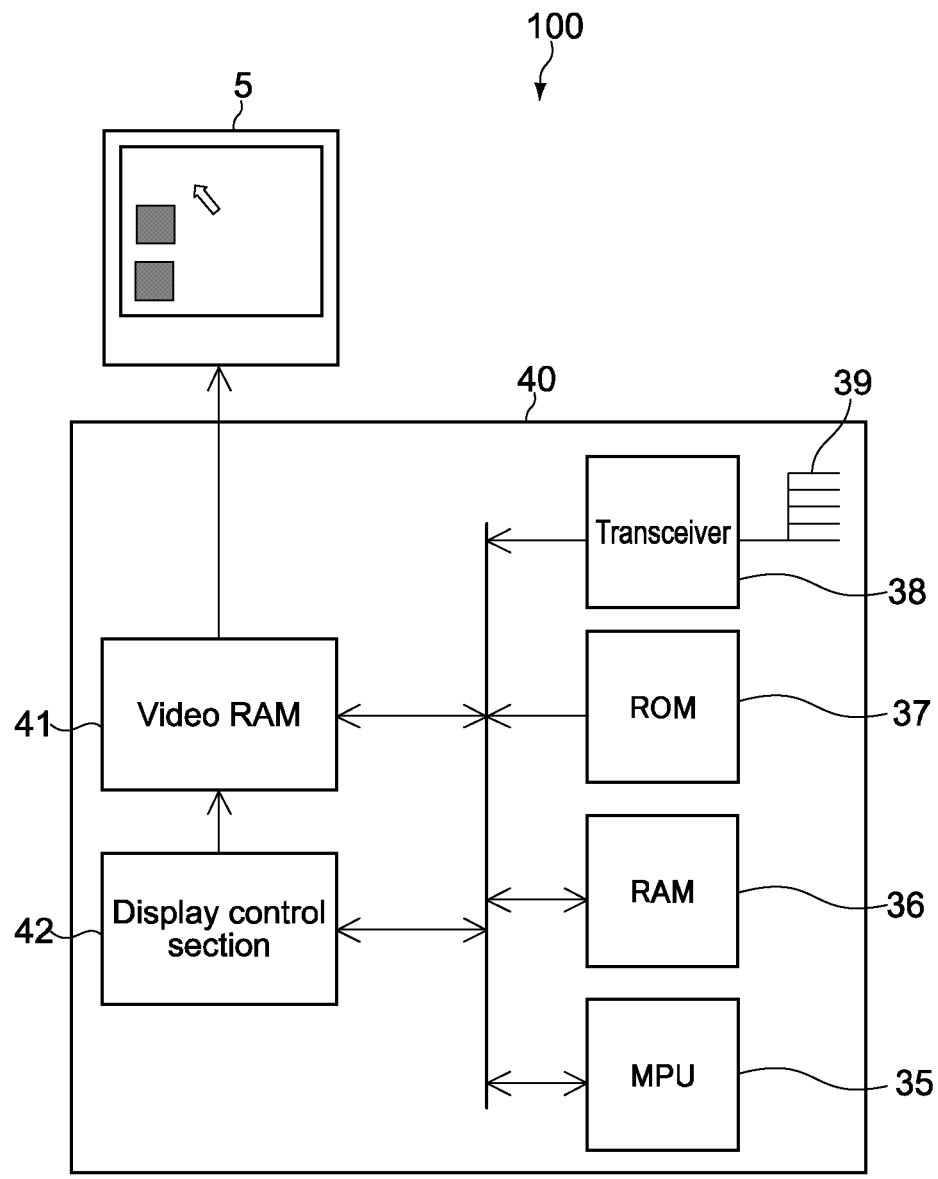
FIG. 1 is a schematic structural diagram showing a control system according to an embodiment.

FIG. 1 is a diagram showing a control system according to the first embodiment. A control system 100 includes a display apparatus 5, a control apparatus 40, and an input apparatus 1.

Figure 2:
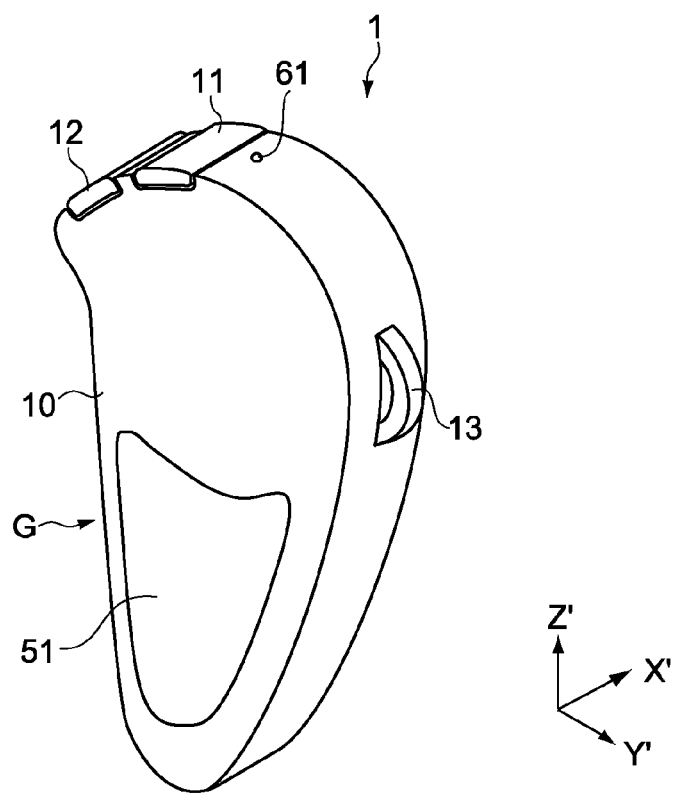
FIG. 2 is a perspective diagram showing an input apparatus according to the embodiment.

FIG. 2 is a perspective diagram showing the input apparatus 1. The input apparatus 1 is of a size that a user is capable of holding. The input apparatus 1 includes a casing 10 and an operation section 23 (FIG. 6) including two buttons 11 and 12 provided at an upper portion of the casing 10, a rotary wheel button 13, and the like. The button 11 disposed closer to the center of the upper portion of the casing 10 functions as a left button of a mouse as an input device for a PC, for example, and the button 12 adjacent to the button 11 functions as a right button of a mouse.

For example, a "drag and drop" operation may be executed by moving the input apparatus 1 while pressing the button 11, a file may be opened by double-clicking the button 11, and a screen 3 may be scrolled by the wheel button 13. Locations of the buttons 11 and 12 and the wheel button 13, a content of a command issued, and the like can arbitrarily be changed.

Figure 3:
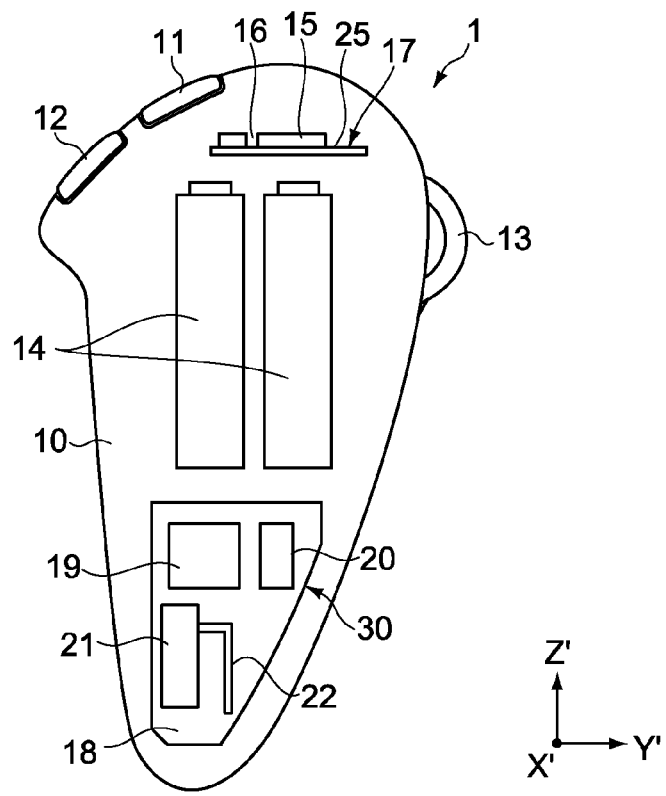
FIG. 3 is a diagram schematically showing an internal structure of the input apparatus.
Figure 4:
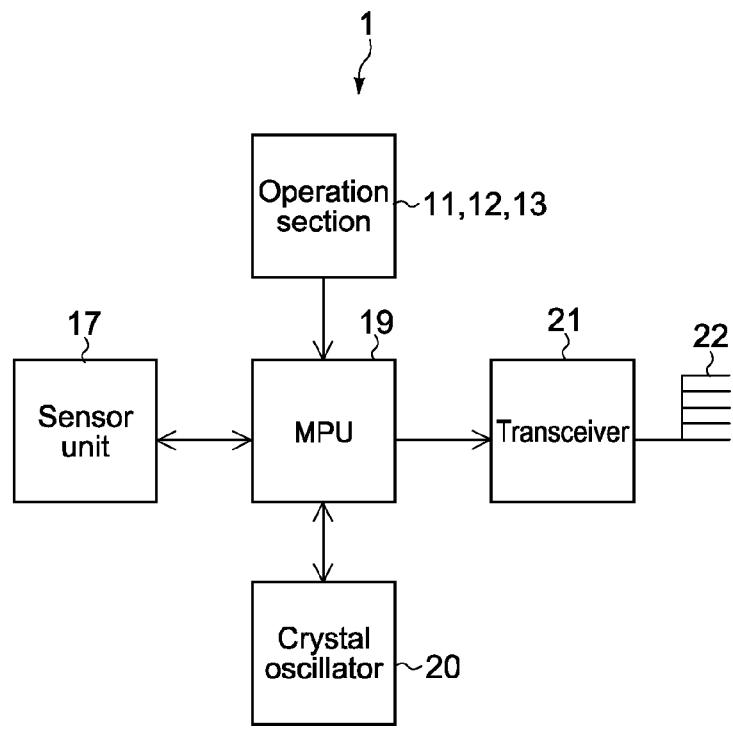
FIG. 4 is a block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor module 17 (output means), a control unit 30, and batteries 14.

Figure 8:
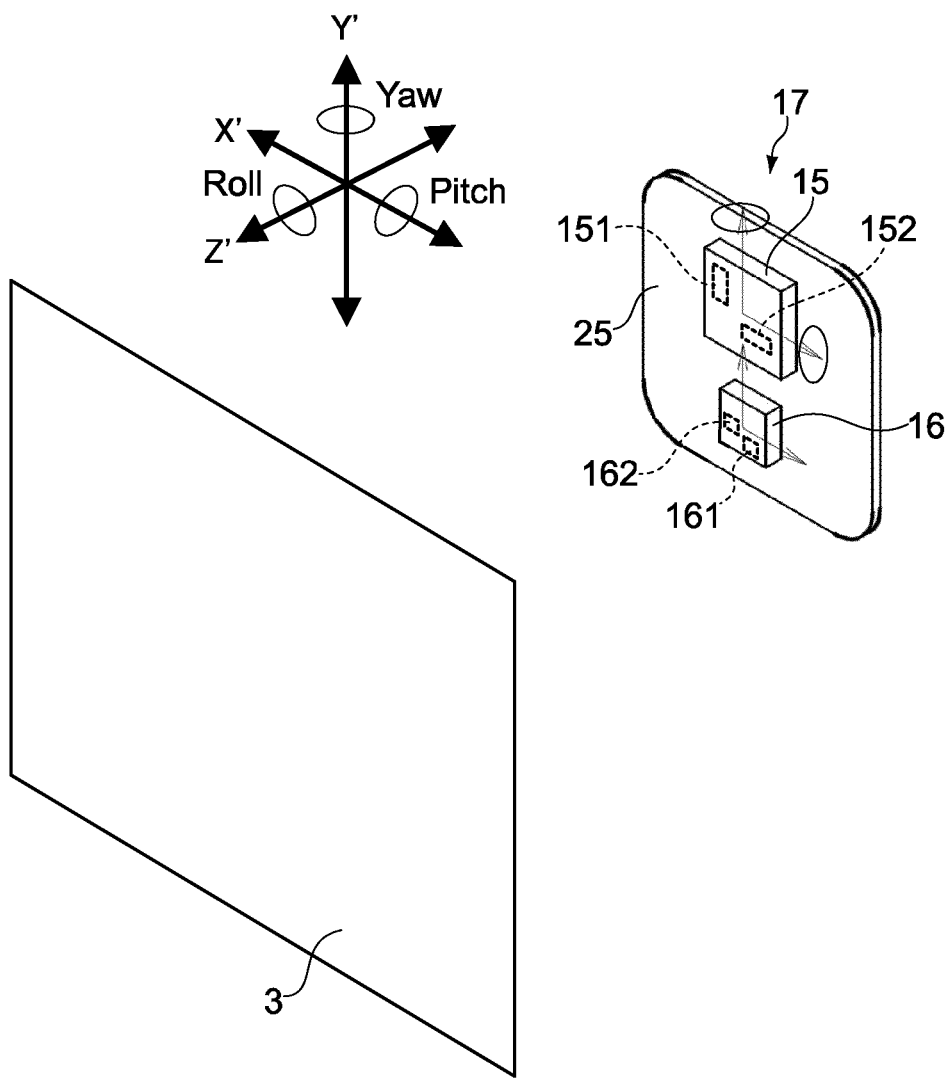
FIG. 8 is a perspective diagram showing a sensor module (sensor unit) incorporated in the input apparatus.

The sensor module 17 mainly detects 3-dimensional movement amounts of the casing 10. FIG. 8 is a perspective diagram showing the sensor module 17.

The sensor module 17 includes an acceleration sensor unit 16 for detecting accelerations in different angles such as along two orthogonal axes (X axis and Y axis). Specifically, the acceleration sensor unit 16 includes two sensors, that is, an acceleration sensor 161 for detecting an acceleration in an X'-axis direction and an acceleration sensor 162 for detecting an acceleration in a Y'-axis direction.

The sensor module 17 further includes an angular velocity sensor unit 15 for detecting angle-related values about the two orthogonal axes. Specifically, the angular velocity sensor unit 15 includes two sensors, that is, an angular velocity sensor 151 for detecting an angular velocity in a rotational direction with the Y'-axis direction as a center axis (yaw direction) and an angular velocity sensor 152 for detecting an angular velocity in a rotational direction with the X'-axis direction as a center axis (pitch direction). The acceleration sensor unit 16 and the angular velocity sensor unit 15 are packaged and mounted on a common surface of a circuit board 25 as a common substrate.

Because the plurality of sensor units 15 and 16 are thus mounted on the common circuit board 25, the sensor module 17 can be reduced in size, thickness, and weight as compared to a case where the sensor units are mounted on different circuit boards.

As each of the angular velocity sensors 151 and 152 for the yaw and pitch directions, respectively, a vibration gyro sensor for detecting Coriolis force in proportion to an angular velocity is used. As each of the acceleration sensors 161 and 162 for the X'- and Y'-axis directions, respectively, any sensor such as a piezoresistive sensor, a piezoelectric sensor, or a capacitance sensor may be used. Each of the angular velocity sensors 151 and 152 is not limited to the vibration gyro sensor, and a rotary top gyro sensor, a ring laser gyro sensor, a gas rate gyro sensor, and the like may also be used. In this embodiment, a sensor that outputs, as a detection signal, a fluctuation of a potential with respect to a reference potential, that corresponds to a movement of the casing, is used for the angular velocity sensors and the acceleration sensors. Any other sensor such as a geomagnetic sensor may be used as long as it is a sensor that outputs a detection signal using the same principle.

In descriptions on FIGS. 2, 3, and 8, a longitudinal direction of the casing 10 is referred to as Z' direction, a thickness direction of the casing 10 is referred to as X' direction, and a width direction of the casing 10 is referred to as Y' direction for convenience. In this case, the sensor module 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis.

In the specification, a coordinate system that moves along with the input apparatus 1, that is, a coordinate system fixed to the input apparatus 1 is expressed using an X' axis, a Y' axis, and a Z' axis, whereas a coordinate system stationary on earth, that is, an inertial coordinate system is expressed using an X axis, a Y axis, and a Z axis. Moreover, in descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

The MPU 19 includes a built-in volatile or nonvolatile memory (storage section) requisite therefor. The MPU 19 is input with a detection signal from the sensor module 17, an operation signal from the operation section, and the like, and executes various kinds of operational processing in order to generate predetermined control signals in response to those input signals. The memory may be provided separate from the MPU 19. It should be noted that the nonvolatile memory stores programs and various kinds of data that are read out at a time of executing a calibration mode to be described later, parameters necessary for the various operations, and the like, and is also capable of storing correction values obtained by executing the calibration mode, and the like.

Typically, the sensor module 17 outputs analog signals. In this case, the MPU 19 includes an A/D (Analog/Digital) converter. Alternatively, the sensor module 17 may be a unit that includes the A/D converter.

The MPU 19 alone or the MPU 19 and the crystal oscillator 20 constitutes/constitute a velocity calculation unit.

The transceiver 21 (transmission means) transmits, as RF radio signals, the control signals (input information) generated by the MPU 19 to the control apparatus 40 via the antenna 22. The transceiver 21 is also capable of receiving various signals transmitted from the control apparatus 40.

The crystal oscillator 20 generates clocks and supplies them to the MPU 19. As the batteries 14, dry cell batteries, rechargeable batteries, and the like are used.

The control apparatus 40 includes an MPU 35 (or CPU), a display control section 42, a RAM 36, a ROM 37, a video RAM 41, an antenna 39, and a transceiver 38.

The transceiver 38 (reception means) receives the control signal transmitted from the input apparatus 1 via the antenna 39. The transceiver 38 is also capable of transmitting various predetermined signals to the input apparatus 1. The MPU 35 analyzes the control signal and executes various kinds of operational processing. The display control section 42 mainly generates screen data to be displayed on the screen 3 of the display apparatus 5 under control of the MPU 35. The video RAM 41 as a work area of the display control section 42 temporarily stores the generated screen data. The MPU 35 and the display control section 42 constitute a display control means.

The control apparatus 40 may be an apparatus dedicated to the input apparatus 1, or may be a PC or the like. The control apparatus 40 is not limited to the apparatus dedicated to the input apparatus 1, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like, or an apparatus in which such a display and the control apparatus 40 are integrated.

Figure 5:
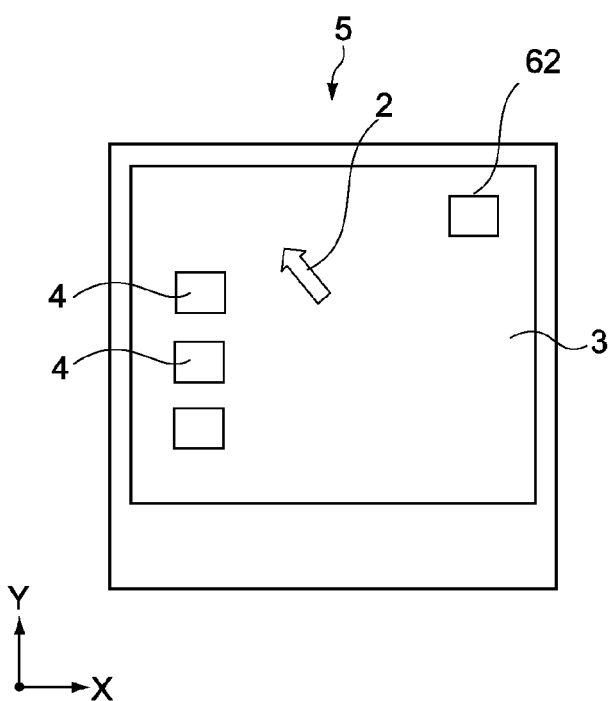
FIG. 5 is a diagram showing an example of a screen displayed on a display apparatus in the control system.

FIG. 5 is a diagram showing an example of the screen 3 displayed on the display apparatus 5. UIs such as icons 4 and a pointer 2 are displayed on the screen 3. The icons are images on the screen 3 representing functions of programs, execution commands, file contents, and the like of the computer. It should be noted that on the screen 3, the horizontal direction is referred to as X-axis direction and the vertical direction is referred to as Y-axis direction.

Figure 6:
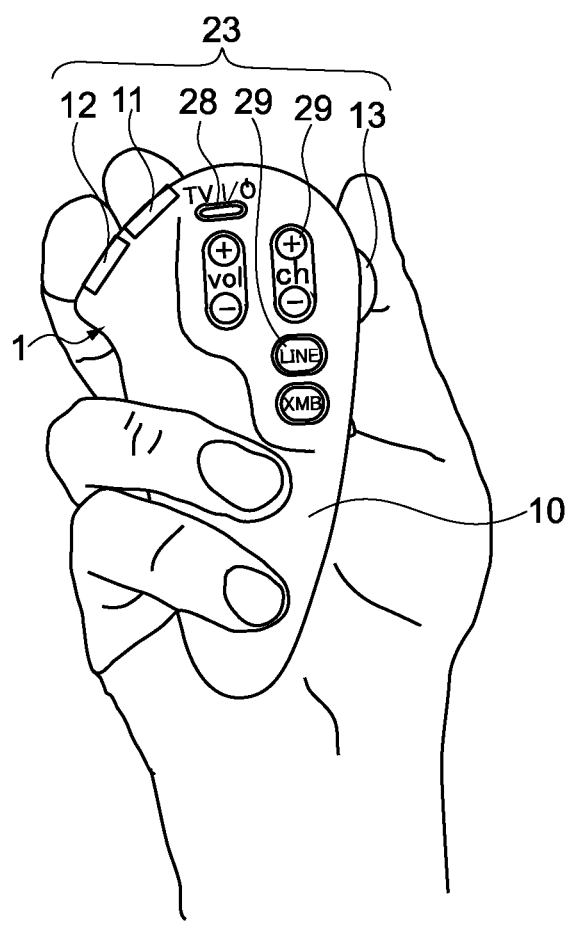
FIG. 6 is a diagram showing a state where a user is holding the input apparatus.

FIG. 6 is a diagram showing a state where a user is holding the input apparatus 1. As shown in FIG. 6, the input apparatus 1 may include, as the operation section 23, various buttons 29 such as those provided to a remote controller for operating a television or the like and a power supply switch 28, for example. When the user moves the input apparatus 1 in the air or operates the operation section 23 while holding the input apparatus 1 as shown in the figure, a command signal generated by the operation is output to the control apparatus 40, and the control apparatus 40 controls the UI.

The MPU 19 of the input apparatus 1 generates, as the command, a movement command corresponding to displacement amounts of the pointer 2 on the screen 3, the displacement amounts typically corresponding to the detection signals obtained by the sensor module 17 (processing means), and generates an operation command corresponding to an operational input made by the user via the operation section 23.

The operation signal input from the user via the operation section 23 is an input signal other than the detection signals of the sensor module 17 as signals on the movement of the input apparatus 1 (casing 10), that is, an operation signal unrelated to the movement of the input apparatus 1.

Figure 9A:
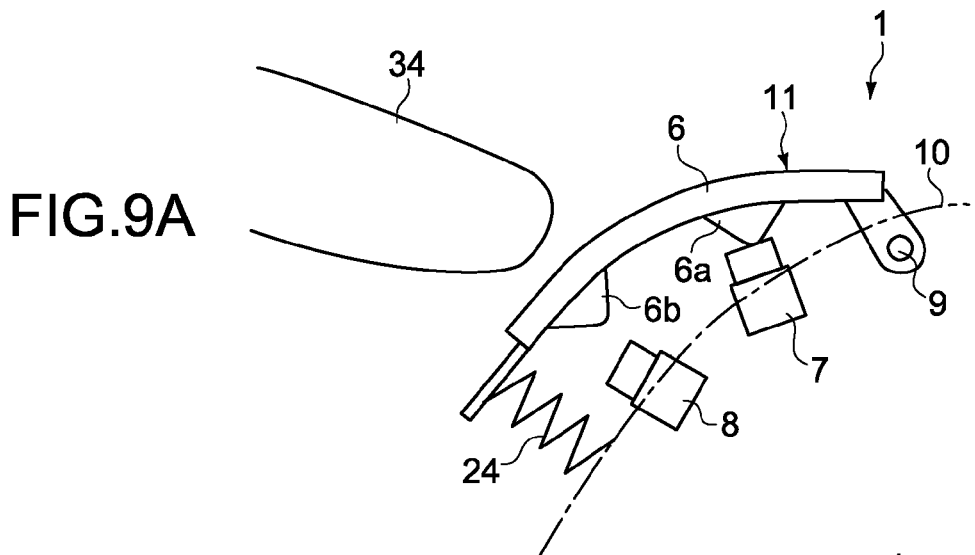
FIG. 9 are schematic diagrams showing a structure of an operation switch (switch means) provided to the input apparatus.
Figure 9B:
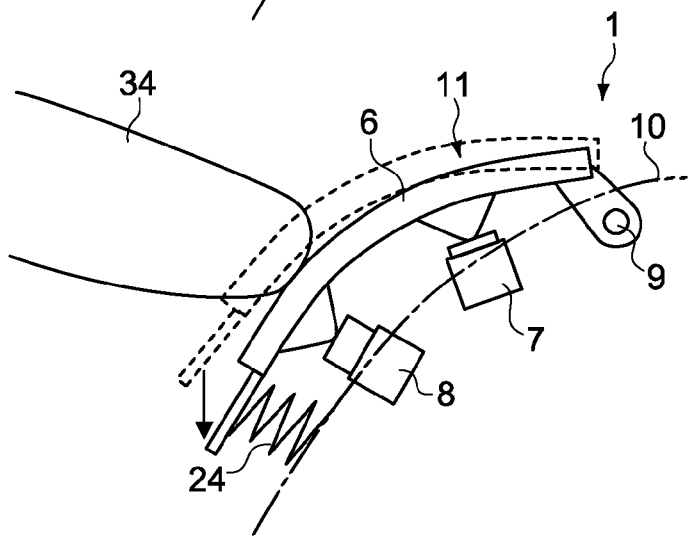
Figure 9C:
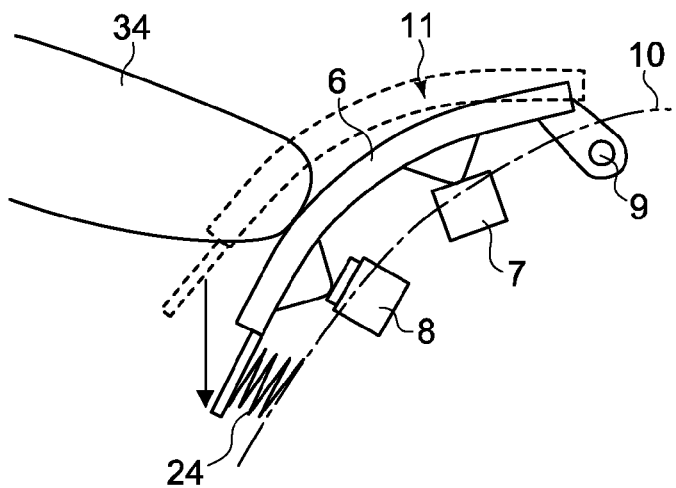

FIGS. 9A to 9C are schematic diagrams showing a structure of the operation button 11 (selection switch).

The operation button 11 as a part of the operation section 23 is a button including a 2-step action. The operation button 11 includes, for example, a movement button 7, a determination button 8 disposed physically apart from the movement button 7, and a surface button 6 capable of successively pressing the movement button 7 and the determination button 8. The movement button 7 has a built-in switch (first switch) (not shown), and the determination button 8 also has a built-in switch (second switch) (not shown). When the movement button 7 is pressed and the first switch is turned on, an operation signal (first operation signal) is input. When the determination button 8 is pressed and the second switch is turned on, an operation signal (second operation signal) is input.

The switches of the movement button 7 and the determination button 8 are electrically connected to the main substrate 18. The MPU 19 outputs controls signals (first and second movement commands) for making a switch between start and stop of the movement of the pointer 2 in accordance with the switch made by the switch of the movement button 7 (processing means).

FIG. 9A is a diagram showing a state where the operation button 11 is not pressed by the user. In this state, the MPU 19 outputs a movement command for inhibiting the movement of the pointer 2 on the screen 3 (second movement command) (second processing mode, pointer immovable mode). The surface button 6 is connected to a shaft 9 provided on the casing 10 and is connected to the casing 10 via a spring 24 at an end portion thereof opposite to the shaft 9. By the user pressing a surface of the surface button 6 by a finger 34, the surface button 6 rotates about the shaft 9 against a spring force of the spring 24. The movement button 7 and the determination button 8 are each a push button. The surface button 6 is provided with, on a back surface thereof, protrusions 6a and 6b capable of respectively pressing the movement button 7 and the determination button 8.

The movement button 7 and the determination button 8 are provided inside the casing 10, for example. By pressing the surface button 6 a predetermined distance (first distance) (see FIG. 9B), the movement button 7 is pressed by the protrusion 6a. Subsequently, by additionally pressing the surface button 6 a predetermined distance (second distance) (see FIG. 9C), the determination button 8 is pressed by the protrusion 6b.

FIG. 9B shows a state where the movement button 7 is pressed but the determination button 8 is not. In this state, the MPU 19 outputs a movement command for moving the pointer 2 on the screen 3 (first movement command) (first processing mode, pointer movable mode).

The movement button 7 (or the first switch) is constituted as a selection means for causing the MPU 19 to select either the first processing mode or the second processing mode. It should be noted that the second processing mode, that is, the processing in which the movement of the pointer 2 on the screen 3 is inhibited includes stopping an output of the movement command, outputting a movement command with the displacement amount of the pointer 2 set to 0, and the like, and either one of them may be employed.

FIG. 9C shows a state where both the movement button 7 and the determination button 8 are pressed. When the determination button 8 is pressed and the second switch is turned on, the MPU 19 outputs a determination command (part of operation command). The determination command is a command for executing predetermined processing with the icons 4 or the like on the screen 3 as a target, for example, and is typically a command for selecting the UI. However, the function of the determination button 8 is not limited thereto, and the determination button 8 is appropriately set with various functions by application programs run on the control apparatus 40.

When releasing the pressed surface button 6, the surface button 6 moves as shown in the stated order of FIG. 9C, FIG. 9B, and FIG. 9A due to a return force of the spring 24. Specifically, the determination button 8 is released first and the movement button 7 is released thereafter.

The first distance and the second distance may be the same (or may be different), and the distances can be set as appropriate. A force required to shift the state from that shown in FIG. 9A to that shown in FIG. 9B may be the same as a force required to shift the state from that shown in FIG. 9B to that shown in FIG. 9C.

With the operation button 11 structured as described above, a so-called halfway pressing that maintains a state where the movement button 7 is pressed but the determination button 8 is not (FIG. 9B) is also possible. By the user moving the input apparatus 1 while pressing the operation button 11 halfway, the control apparatus 40 controls display so as to move the pointer 2 to a desired position.

It should be noted that although the example where each step of the operation button 11 above is constituted of a mechanical switch has been described, the present application is not limited thereto. For example, the operation button 11 may be structured such that the first step (first switch) is constituted of a photo switch that uses an optical sensor or the like, and the second step (second switch) is constituted of a mechanical switch as described above.

(Basic Operation of Control System)

Next, a description will be given on typical examples of ways of moving the input apparatus 1 and ways the pointer 2 moves on the screen 3 accordingly. FIG. 7 are explanatory diagrams therefor.

Figure 7A:
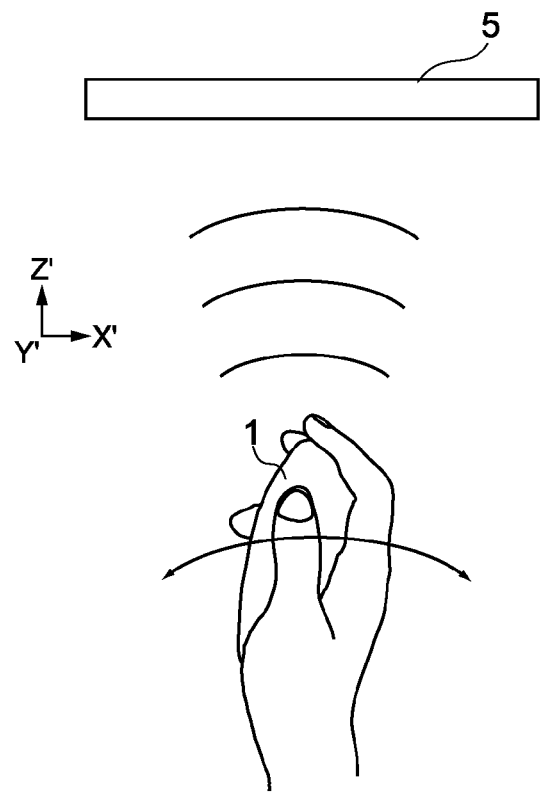
FIG. 7 are diagrams for illustrating typical examples of ways of moving the input apparatus and ways a pointer moves on the screen accordingly.
Figure 7B:
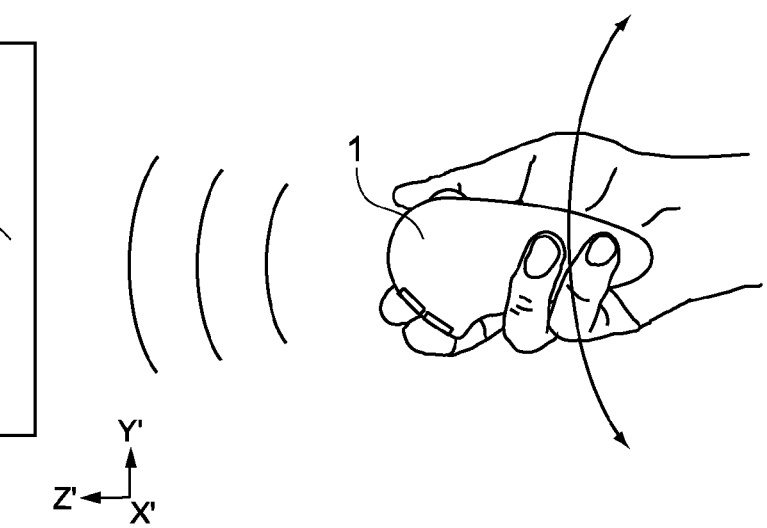

As shown in FIGS. 7A and 7B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 of the sensor module 17 (see FIG. 8) is close to being in parallel with the screen 3 of the display apparatus 5, and the two axes as detection axes of the sensor module 17 (X' axis and Y' axis) respectively correspond to the horizontal axis (X axis) and the vertical axis (Y axis) on the screen 3. Hereinafter, the position of the input apparatus 1 as shown in FIGS. 7A and 7B will be referred to as reference position.

As shown in FIG. 7A, in the reference position, the user swings a wrist or an arm in the lateral direction, that is, the yaw direction. At this time, the acceleration sensor 161 for the X'-axis direction detects an acceleration $a_x$ in the X'-axis direction (first or second acceleration value), and the angular velocity sensor 151 for the yaw direction detects an angular velocity $\omega_\psi$ about the Y' axis. Based on those detection values, the control apparatus 40 controls display of the pointer 2 so that the pointer 2 moves in the X-axis direction.

Meanwhile, as shown in FIG. 7B, in the reference position, the user swings the wrist or the arm in the vertical direction, that is, the pitch direction. At this time, the acceleration sensor 162 for the Y'-axis direction detects an acceleration $a_y$ in the Y'-axis direction (second or first acceleration value), and the angular velocity sensor 152 for the pitch direction detects an angular velocity $\omega_\theta$ about the X' axis. Based on those detection values, the control apparatus 40 controls display of the pointer 2 so that the pointer 2 moves in the Y-axis direction.

In this embodiment, the MPU 19 of the input apparatus 1 calculates velocity values in the X'- and Y'-axis directions based on the detection signals detected by the sensor module 17, in accordance with programs stored in the built-in non-volatile memory. The input apparatus 1 transmits the velocity values to the control apparatus 40.

The control apparatus 40 converts a displacement in the yaw direction per unit time into a displacement amount of the pointer 2 on the X axis on the screen 3, and converts a displacement in the pitch direction per unit time into a displacement amount of the pointer 2 on the Y axis on the screen 3, and thus moves the pointer 2.

Typically, regarding the velocity values supplied every predetermined number of clocks, the MPU 35 of the control apparatus 40 adds an n-th velocity value that has been supplied to a (n-1)-th velocity value that has been supplied. Accordingly, the n-th velocity value that has been supplied corresponds to the displacement amount of the pointer 2, and coordinate information of the pointer 2 on the screen 3 is generated.

In another embodiment, the input apparatus 1 transmits physical amounts detected by the sensor module 17 to the control apparatus 40. In this case, the MPU 35 of the control apparatus 40 calculates the velocity values in the X'- and Y'-axis directions based on the received input information in accordance with the program stored in the ROM 37, and controls display so that the pointer 2 moves in accordance with the velocity values.

Figure 10:
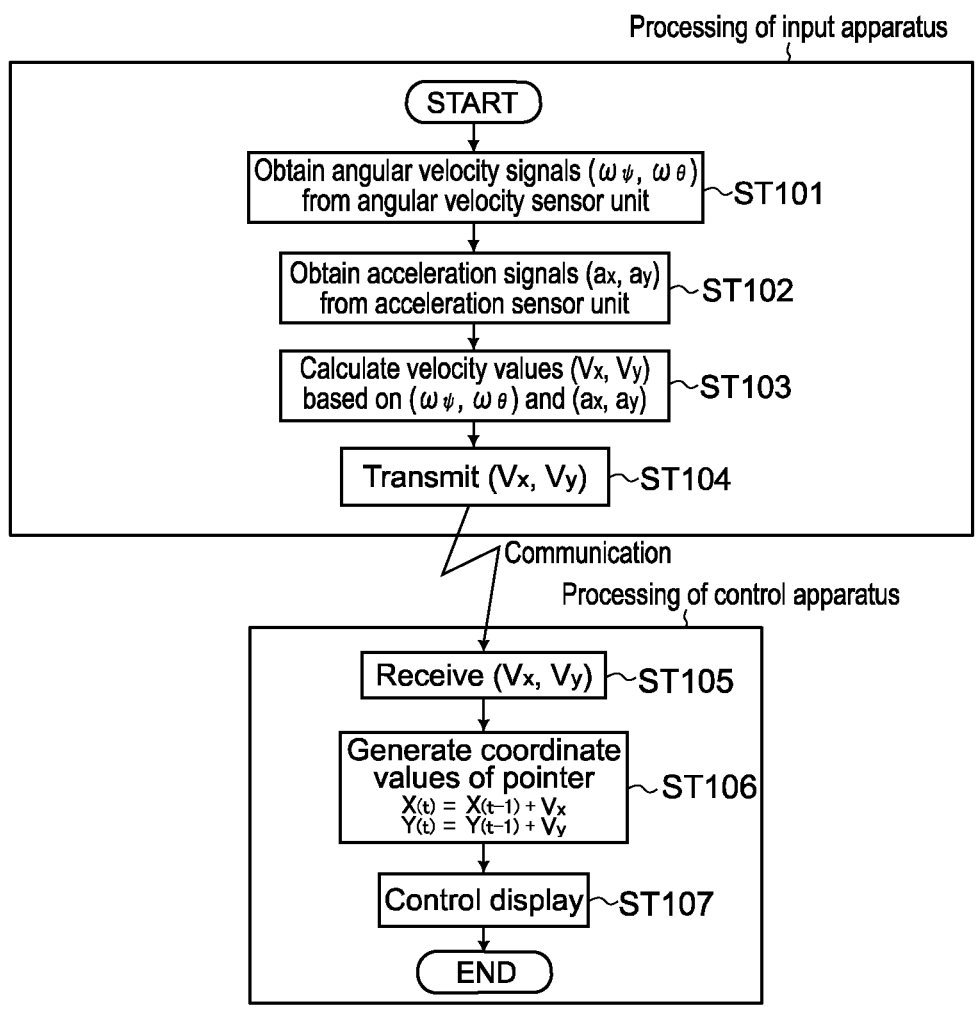
FIG. 10 is a flowchart showing an operation of the control system.

Next, an operational example of the control system 100 will be described. FIG. 10 is a flowchart showing a typical example of the operation.

The power of the input apparatus 1 is turned on. For example, the user turns on a power supply switch or the like provided to the input apparatus 1 or the control apparatus 40 to turn on the power of the input apparatus 1. Upon turning on the power, biaxial angular velocity signals are output from the angular velocity sensor unit 15. The MPU 19 obtains the first angular velocity value $\omega_\psi$, and the second angular velocity value $\omega_\theta$ from the biaxial angular velocity signals (Step 101).

Further, upon turning on the power of the input apparatus 1, biaxial acceleration signals are output from the acceleration sensor unit 16. The MPU 19 obtains the first acceleration value $a_x$ and the second acceleration value $a_y$ from the biaxial acceleration signals (Step 102). The signals of the acceleration values are signals corresponding to the position of the input apparatus 1 at a point when the power is turned on (hereinafter, referred to as initial position). Hereinafter, the initial position will be described as being the reference position. It should be noted that the MPU 19 typically carries out the processes of Steps 101 and 102 in sync with a predetermined clock cycle.

Based on the acceleration values ($a_x$, $a_y$) and the angular velocity values ($\omega_\psi$, $\omega_\theta$), the MPU 19 calculates velocity values (first and second velocity values $V_x$ and $V_y$) by a predetermined operation (Step 103). The first velocity value $V_x$ is a velocity value in a direction along the X' axis, and the second velocity value $V_y$ is a velocity value in a direction along the Y' axis. A calculation method of the velocity values will be described later in detail. Considering this point, at least the sensor module 17 alone or the MPU 19 and the sensor module 17 functions/function as a movement signal output means for outputting velocity-related values as movement signals of the input apparatus 1. In this embodiment, the velocity values are exemplified as the velocity-related values.

As will be described later, the velocity values ($V_x$, $V_y$) may be calculated based on the acceleration values ($a_x$, $a_y$) and the angular velocity values ($\omega_\psi$, $\omega_\theta$) instead of simply integrating the acceleration values ($a_x$, $a_y$).

The MPU 19 transmits information on the calculated pointer velocity values ($V_x$, $V_y$) to the control apparatus 40 via the transceiver 21 and the antenna 22 (Step 104).

The MPU 35 of the control apparatus 40 receives the information on the pointer velocity values ($V_x$, $V_y$) via the antenna 39 and the transceiver 38 (Step 105). Because the input apparatus 1 transmits the pointer velocity values ($V_x$, $V_y$) every predetermined clocks, that is, per unit time, the control apparatus 40 can receive this and obtain displacement amounts in the X- and Y-axis directions per unit time.

The MPU 35 generates coordinate values (X(t), Y(t)) of the pointer 2 on the screen 3 that correspond to the obtained displacement amounts in the X- and Y-axis directions per unit time using Equations (1) and (2) below (Step 106). Based on the generated coordinate values, the MPU 35 controls display so that the pointer 2 moves on the screen 3 (Step 107) (display control means).

$$X(t)=X(t-1)+V_x' \tag{1}$$

$$Y(t)=Y(t-1)+V_y' \tag{2}$$

In FIG. 10, the input apparatus 1 carries out the main operations to calculate the pointer velocity values ($V_x$, $V_y$). However, in an embodiment shown in FIG. 11, the control apparatus 40 carries out the main operations.

Figure 11:
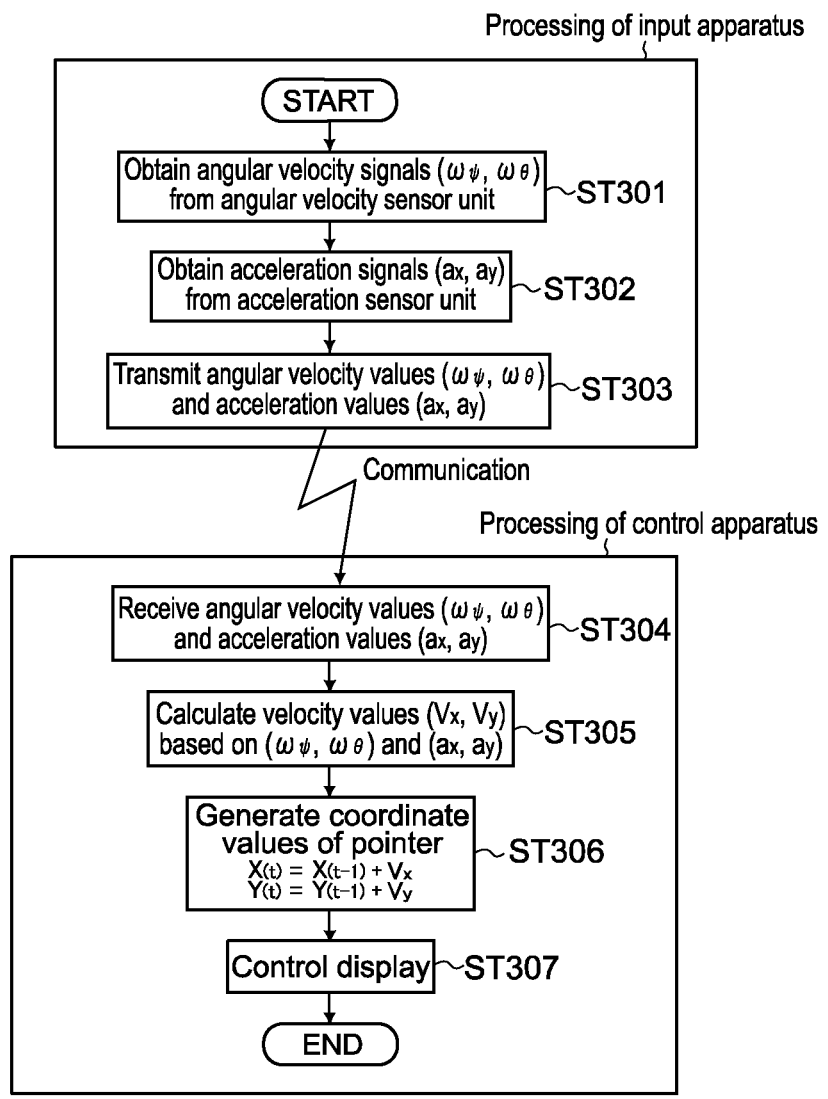
FIG. 11 is a flowchart showing an operation of the control system in a case where a control apparatus of the control system carries out main operations.

As shown in FIG. 11, processes of Steps 301 and 302 are the same as those of Steps 101 and 102. The input apparatus 1 transmits information on detection values, that is, biaxial acceleration values and biaxial angular velocity values output from the sensor module 17, to the control apparatus 40, for example (Step 303). The MPU 35 of the control apparatus 40 receives the information on the detection values (Step 304) and executes the same processes as Steps 103, 106, and 107 (Steps 305 to 307).

It should be noted that FIGS. 10 and 11 have shown the examples where the accelerations are obtained after the angular velocities. However, the present application is not limited thereto, and the angular velocities may be obtained after the accelerations, or the angular velocities and the accelerations may be obtained at the same time.

Figure 12:
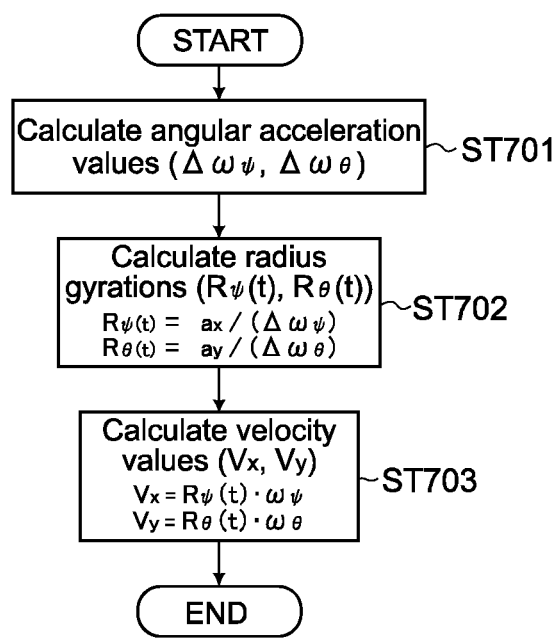
FIG. 12 is a flowchart showing an operation of the input apparatus regarding a velocity value calculation method according to the embodiment.
Figure 13:
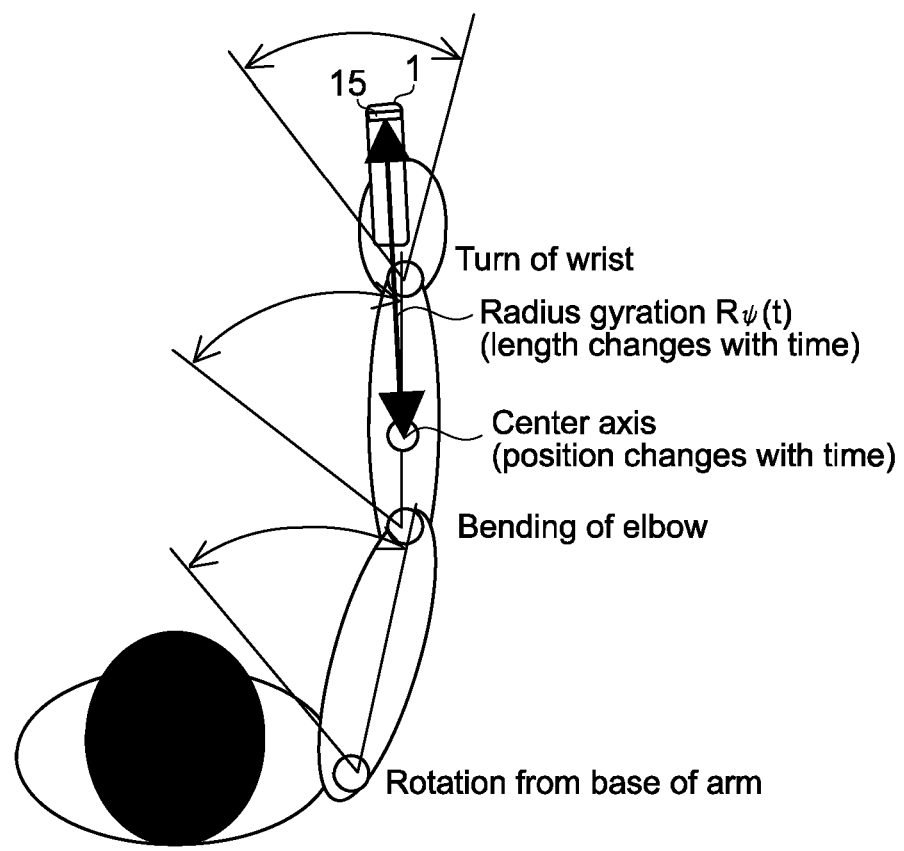
FIG. 13 is a diagram for illustrating a basic idea of the velocity value calculation method according to the embodiment.

Hereinafter, a description will be given on a method of calculating the velocity values ($V_x$, $V_y$) in Step 103 of FIG. 10 and Step 305 of FIG. 11. FIG. 12 is a flowchart showing an operation of the input apparatus 1. FIG. 13 is a diagram for illustrating a basic idea of the velocity value calculation method.

FIG. 13 is a top view of the user operating the input apparatus 1 by swinging it in, for example, the lateral direction (yaw direction). As shown in FIG. 13, when the user operates the input apparatus 1 naturally, an operation is made by using at least one of a turn of a wrist (or a hand), a bending of an elbow, and a rotation from a base of an arm. Therefore, a comparison between the movement of the input apparatus 1 and the rotations of a wrist (or a hand), an elbow, and a base of an arm shows that there exist relationships of 1 and 2 below.

1. The angular velocity value $\omega_\psi$ of the input apparatus 1 about the Y' axis is a combined value of an angular velocity obtained by the rotation of a shoulder, an angular velocity obtained by the bending of an elbow, and an angular velocity obtained by the turn of a hand (or a wrist).

2. The velocity value $V_x$ of the input apparatus 1 in the X'-axis direction is a combined value of values obtained by respectively multiplying the angular velocities of the shoulder, the elbow, the hand, and the like by a distance between the shoulder and the input apparatus 1, a distance between the elbow and the input apparatus 1, a distance between the hand and the input apparatus 1, and the like.

Here, regarding a rotational movement of the input apparatus 1 in a minute time, the input apparatus 1 can be considered to be rotating about a center axis parallel to the Y' axis and whose position changes with time. Assuming that a distance between the center axis whose position changes with time and the input apparatus 1 is a radius gyration $R_\psi(t)$ about the Y' axis (first radius gyration or second radius gyration), the relationship between the velocity value $V_x$ and the angular velocity value $\omega_\psi$ of the input apparatus 1 can be expressed by Equation (3) below. In other words, the velocity value $V_x$ in the X'-axis direction becomes a value obtained by multiplying the angular velocity value $\omega_\psi$ about the Y' axis by the distance $R_\psi(t)$ between the center axis and the input apparatus 1.

$$V_x = R_\psi(t) * \omega_\psi \quad (3)$$

As shown in Equation (3), the relationship between the velocity value and the angular velocity value of the input apparatus 1 is a proportional relationship, that is, a correlation with $R_\psi(t)$ as a proportional constant.

Equation (3) above is modified to obtain Equation (4).

$$R_\psi(t) = V_x / \omega_\psi \quad (4)$$

The right-hand side of Equation (4) is a velocity dimension. Even when the velocity value and the angular velocity value represented on the right-hand side of Equation (4) are differentiated to obtain a dimension of the acceleration or acceleration time change rate, the correlation is not lost. Similarly, even when the velocity value and the angular velocity value are integrated to obtain a displacement dimension, the correlation is not lost.

Therefore, with the velocity and the angular velocity represented on the right-hand side of Equation (4) as a dimension of the displacement, acceleration, and acceleration time change rate, Equations (5), (6), and (7) below can be obtained.

$$R_\psi(t) = x/\psi \quad (5)$$

$$R_\psi(t) = a_x / \Delta\omega_\psi \quad (6)$$

$$R_\psi(t) = \Delta a_x / \Delta(\Delta\omega_\psi) \quad (7)$$

Focusing on Equation (6) out of Equations (4), (5), (6), and (7) above, for example, it can be seen that the radius gyration $R_\psi(t)$ can be obtained if the acceleration value $a_x$ and the angular acceleration value $\Delta\omega_\psi$ are known. As described above, the acceleration sensor 161 detects the acceleration value $a_x$ in the X'-axis direction, and the angular velocity sensor 151 detects the angular velocity value $\omega_\psi$ about the Y' axis. Therefore, if the angular velocity value $\omega_\psi$ about the Y' axis is differentiated to thus calculate the angular acceleration value $\Delta\omega_\psi$ about the Y' axis, the radius gyration $R_\psi(t)$ about the Y' axis can be obtained.

If the radius gyration $R_\psi(t)$ about the Y' axis is known, the velocity value $V_x$ of the input apparatus 1 in the X'-axis direction can be obtained by multiplying the radius gyration $R_\psi(t)$ by the angular velocity value $\omega_\psi$ about the Y' axis detected by the angular velocity sensor 151 (see Equation (3)). Specifically, a rotational operation amount itself of the user is converted into a linear velocity value in the X'-axis direction, with the result that a velocity value that matches an intuition of the user is obtained. Therefore, because the movement of the pointer 2 becomes a natural movement with respect to the movement of the input apparatus 1, operability of the input apparatus for the user is improved.

This velocity value calculation method can also be applied in a case where the user operates the input apparatus 1 by swinging it in the vertical direction (pitch direction).

FIG. 12 shows an example where Equation (6) is used. Referring to FIG. 12, the MPU 19 of the input apparatus 1 calculates angular acceleration values ($\Delta\omega_\psi$, $\Delta\omega_\theta$) by differentiating the angular velocity values ($\omega_\psi$, $\omega_\theta$) obtained in Step 101 (Step 701).

Using the acceleration values ($a_x$, $a_y$) obtained in Step 102 and the angular acceleration values ($\Delta\omega_\psi$, $\Delta\omega_\theta$), the MPU 19 calculates the radius gyrations ($R_\psi(t)$, $R_\theta(t)$) about the Y' axis and the X' axis using Equations (6) and (8) (Step 702).

$$R_\psi(t) = a_x / \Delta\omega_\psi \quad (6)$$

$$R_\theta(t) = a_y / \Delta\omega_\theta \quad (8)$$

After the radius gyrations are calculated, the velocity values ($V_x$, $V_y$) are calculated using Equations (3) and (9) (Step 703).

$$V_x = R_\psi(t) * \omega_\psi \quad (3)$$

$$V_y = R_\theta(t) * \omega_\theta \quad (9)$$

The rotational operation amounts themselves of the user with respect to the input apparatus 1 are thus converted into the linear velocity values in the X'- and Y'-axis directions, with the result that the velocity values that match the intuition of the user are obtained.

Further, by using the acceleration values ($a_x$, $a_y$) detected by the acceleration sensor unit 16 as they are, power consumption of the input apparatus 1 as well as a calculation amount can be reduced.

The MPU 19 only needs to obtain ($a_x$, $a_y$) from the acceleration sensor unit 16 every predetermined clocks, and calculate the velocity values ($V_x$, $V_y$) in sync therewith, for example. Alternatively, the MPU 19 may calculate the velocity values ($V_x$, $V_y$) once every time a plurality of acceleration values ($a_x$, $a_y$) are sampled.

It should be noted that the velocity values ($V_x$, $V_y$) do not always need to be calculated by the calculation method above. For example, the MPU 19 may employ a method of calculating the velocity values by integrating the acceleration values ($a_x$, $a_y$) while using the angular velocity values ($\omega_\psi$, $\omega_\theta$) as an adjunct for the integration operation. Alternatively, the velocity values ($V_x$, $V_y$) may be calculated by simply integrating the acceleration values ($a_x$, $a_y$). Alternatively, the detected angular velocity values ($\omega_\psi$, $\omega_\theta$) may be used as they are as the velocity values ($V_x$, $V_y$) of the casing. It is also possible to calculate the angular acceleration values ($\Delta\omega_\psi$, $\Delta\omega_\theta$) by temporally differentiating the detected angular velocity values ($\omega_\psi$, $\omega_\theta$) and use the angular acceleration values ($\Delta\omega_\psi$, $\Delta\omega_\theta$) as the acceleration values of the casing.

(Detection of Sensor Output)

The input apparatus 1 of this embodiment uses the sensor module 17 including the angular velocity sensors (angular velocity sensor unit 15) and the acceleration sensors (acceleration sensor unit 16) that do not detect displacements directly, but detect inertial amounts in dimensions of the displacements obtained by temporally differentiating the angular velocities, accelerations, and the like. Those inertial sensors each output a fluctuation of a potential with respect to a reference potential, that corresponds to the movement of the casing 10, as a detection signal.

Hereinafter, an exemplary method of detecting angular velocities will be described while taking the angular velocity sensor as an example.

Figure 14A:
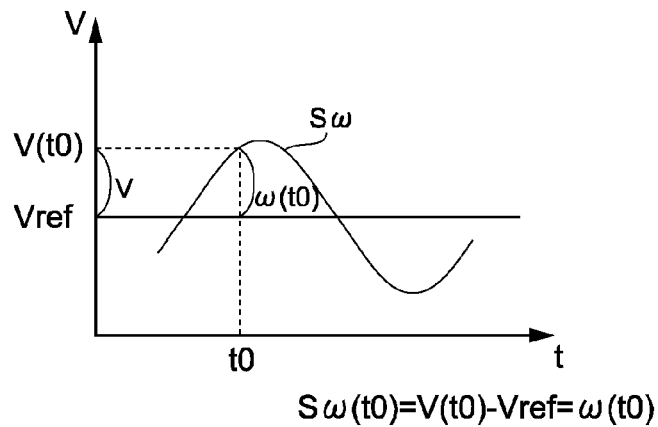
FIG. 14 are diagrams for illustrating an example of an angular velocity calculation method and a necessity of calibrating a sensor, according to the embodiment.

FIG. 14A shows an example of an output of the angular velocity sensor. The angular velocity sensor outputs a potential signal $S_\omega$ with a reference potential Vref as a reference. An angular velocity value $\omega(t0)$ at a time t0 can be obtained by an operation shown in Equation (10), with reference to the angular velocity signal $S\omega(t0)$.

$$S\omega(t0)=V(t0)-\text{Vref} \quad (10)$$

The reference potential Vref may be a ground potential or a DC (Direct Current) potential offset with respect to the ground potential. The reference potential Vref is sometimes referred to as a DC offset (value), a DC center (value), or the like. In either case, the output signal $S\omega$ of the angular velocity sensor includes the reference potential Vref and a potential signal with respect to the reference potential Vref, that corresponds to the movement of the input apparatus (casing). The slower the movement of the casing is, the smaller the fluctuation of the potential (V) from the reference potential Vref becomes, whereas the larger the movement of the casing is, the larger the fluctuation of the potential (V) from the reference potential Vref becomes. Therefore, unless the reference potential Vref is known, it is almost impossible to accurately detect the movement of the casing.

(Calibration of Sensor)

Figure 14B:
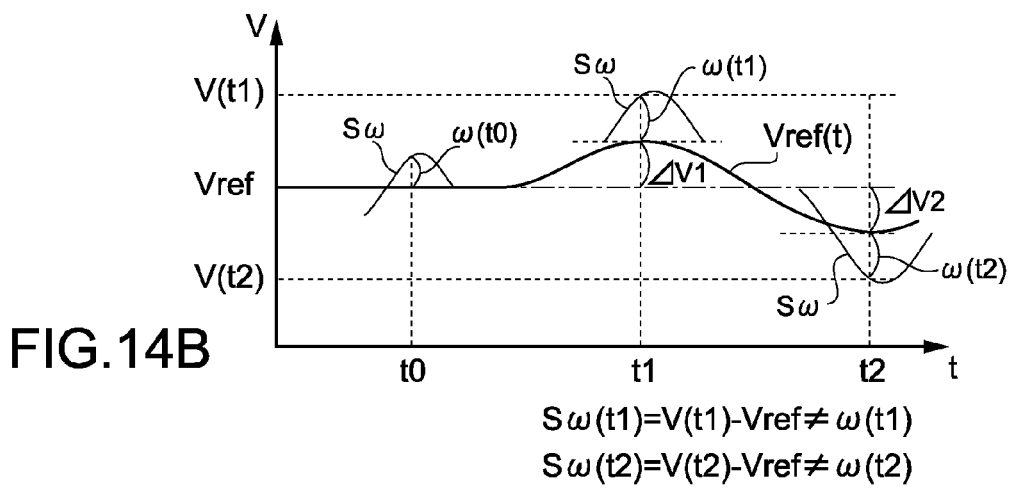

The reference potential Vref of the sensor is set as appropriate based on sensitivity characteristics of the sensor unit, electrical characteristics of peripheral circuits or devices, and the like. However, the reference potential Vref fluctuates according to characteristics (e.g., temperature drift and change in vibration mode) of devices constituting the sensor, an external stress, and circuit characteristics (e.g., temperature characteristics, time constant, and SN ratio of amplifier output) of analog circuits, and a transition of the fluctuation is not uniform. FIG. 14B shows an example of the fluctuation of the reference potential Vref.

The fluctuation of the reference potential Vref causes a deviation in the calculation of the angular velocity values. This is because, when the reference potential Vref is a fixed value, the angular velocity value $\omega$ is calculated based on Equation (10) with the set reference value Vref as a reference, regardless of the fluctuation of the reference potential.

For example, in the example of FIG. 14B, an angular velocity value $\omega(t1)$ at a time t1 is calculated using Equation (11) based on an angular velocity signal $S\omega(t1)$, and an angular velocity value $\omega(t2)$ at a time t2 is calculated using Equation (12) based on an angular velocity signal $S\omega(t2)$.

$$S\omega(t1)=V(t1)-\text{Vref} \quad (11)$$

$$S\omega(t2)=V(t2)-\text{Vref} \quad (12)$$

However, the reference potential Vref fluctuates with time, thus resulting in a value different from a preset value. In the example of FIG. 14B, the actual angular velocity value $\omega(t1)$ at the time t1 is deviated only by $\Delta V1$ by the value calculated in Equation (11), and the actual angular velocity value $\omega(t2)$ at the time t2 is deviated only by $\Delta V2$ by the value calculated in Equation (12). In this case, the operational feeling of the input apparatus is of course degraded, but a situation in which the pointer moves on the screen even when the input apparatus is stopped is also induced.

Figure 14C:
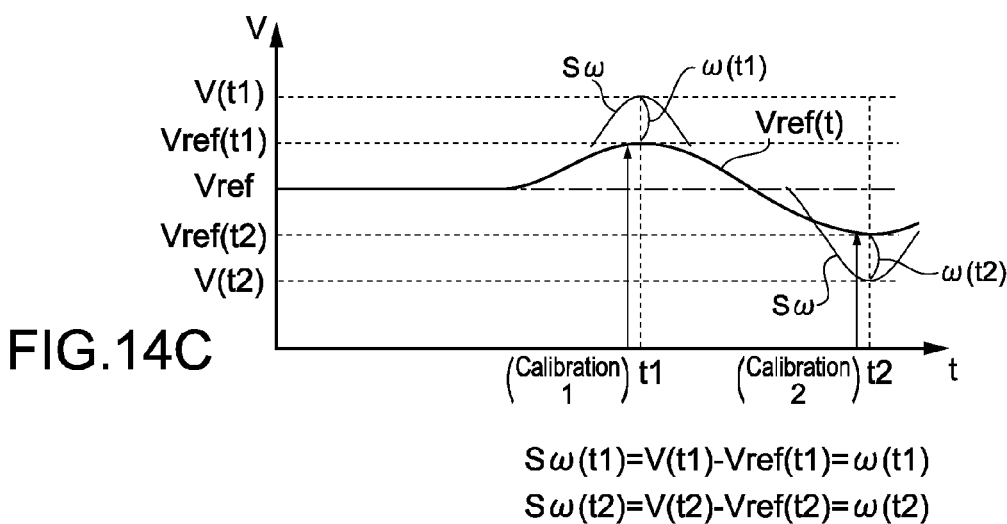

In this regard, for enhancing the operational feeling of the input apparatus, it is necessary to periodically or unperiodically carry out processing for canceling the fluctuation of the reference potential Vref. This processing is generally called calibration or zero-point calibration, for example. As shown in FIG. 14C, by successively carrying out the calibration (correction of reference potential) of the sensor, it becomes possible to enhance detection accuracy of the angular velocity values $\omega(t1)$ and $\omega(t2)$ at the times t1 and t2, respectively, as shown in Equations (13) and (14).

$$S\omega(t1)=V(t1)-\text{Vref}(t1) \quad (13)$$

$$S\omega(t2)=V(t2)-\text{Vref}(t2) \quad (14)$$

As described above, the sensor calibration is processing corresponding to a modification or reset of the reference potential value. Therefore, higher calibration accuracy can be obtained as the movement of the casing is less reflected on the output signals of the sensors, that is, as the state of the input apparatus becomes closer to the static state. As the method of calibrating the sensor in the input apparatus of this type, there is known a method of correcting a reference potential of a sensor by assuming that an input apparatus is in a static state when an output of a gyro sensor is equal to or smaller than a predetermined threshold value (see U.S. Pat. No. 5,825,350).

However, the calibration method in which the sensor is calibrated after waiting for the casing to become static entails various adverse effects due to the sensor not being calibrated at the time the input apparatus is being used.

For example, it is known that, in a gyro sensor or the like that uses a piezoelectric effect, an activation drift of the sensor is relatively large immediately after the power is turned on. Therefore, for relieving awkwardness in the movement operation of the pointer at an early stage of the operation, the effect of an activation drift needs to be suppressed by calibrating the sensor even during the operation. However, in the method in which the calibration is started only when the input apparatus is in the static state, it is almost impossible to converge the activation drift of the sensor during the operation of the input apparatus.

Further, the reference potential of the sensor is known to change with time. Therefore, for securing stable movement accuracy of the pointer at all times while the input apparatus is used, it becomes necessary to successively calibrate the sensor not only when the input apparatus is in the static state but also while the input apparatus is being used.

On the other hand, in the method of calibrating the sensor only when the output of the sensor is equal to or smaller than a predetermined threshold value, a calibration is started as long as the condition is satisfied during the operation of the input apparatus. Therefore, there are cases where, while the user is moving the input apparatus slowly in one direction at approximately a constant velocity, the calibration processing is executed with an output value of the gyro sensor at this time as a reference. In this case, a cursor moves on its own in a direction opposite to the one direction even when the movement of the input apparatus is stopped, which is inconvenient and causes lowering of the operational feeling.

Meanwhile, it is possible to solve the above problem by strictly (narrowly) setting a threshold value for the sensor output that is to be a reference for starting the calibration. However, if the threshold value is set strictly, there is a fear that, due to noises and minute vibrations in the environment, an inconvenience that a mode cannot be shifted to a calibration mode even though the input apparatus is not actually operated or is in the static state may be newly caused.

In this regard, the input apparatus 1 of this embodiment is structured to be capable of calibrating the angular velocity sensor even during the movement operation of the pointer. In addition, the calibration method (calibration condition) of the sensor is differentiated according to an operational state or an operation status of the input apparatus 1 by the user. As a result, it becomes possible to appropriately calibrate the angular velocity sensor irrespective of whether the input apparatus 1 is in the static state or not.

A user test was conducted regarding an operation pattern of a 3-dimensional operation input apparatus. As a result, it was found that a user operates an input apparatus relatively slowly at a near-constant velocity when moving a pointer on a screen. In other cases, that is, when not moving the pointer, however, the user was not recognized to operate the input apparatus slowly at a near-constant velocity. It is presumed that this is mainly due to a psychological resistance toward the fact that a slow movement is not reflected since, when not moving the pointer, a delicate operation is not required for the user or there is no need for the user to move the pointer slowly at a constant velocity.

Based on the finding above, in the input apparatus 1 of this embodiment, the calibration condition of the angular velocity sensor is changed between a first processing mode (pointer movable mode) in which the pointer 2 is moved on the screen 3 and a second processing mode (pointer immovable mode) in which the movement of the pointer 2 is inhibited. Moreover, it becomes possible to reflect the user's intention of using the input apparatus 1 on a detection of a slow near-constant velocity operation by referencing, in switching the calibration condition, an operation signal of the operation button 11 (movement button 7) (FIG. 9) for making a switch between a movable state and an immovable state of the pointer. Accordingly, the angular velocity sensor can be calibrated appropriately.

(Structure of Input Apparatus)

As described above, the input apparatus 1 of this embodiment includes the casing 10, the sensor module 17 as the sensor unit, and the MPU 19 as the velocity calculation unit. The sensor module 17 includes the angular velocity sensor unit 15 and the acceleration sensor unit 16 that each output, as a detection signal, a fluctuation of a potential with respect to the reference potential, that corresponds to the movement of the casing 10. As described above, the MPU 19 has a function of executing the first processing mode as processing for calculating the pointer velocity values $(V_x, V_y)$ that are velocity values for moving the pointer 2 based on the detection signals (output values) of the sensor module 17, and moving the pointer 2 on the screen 3 in accordance with the pointer velocity values.

In addition, the MPU 19 has a function of executing a calibration mode as processing for correcting the reference potential of the sensors (calibration means). The MPU 19 also includes the following function for executing the calibration function.

Specifically, the MPU 19 has a function of judging the operational state of the input apparatus 1 based on a button operation made to the operation button 11 by the user judgment means). In other words, the MPU 19 judges that the operational state is a pointer-moving state (screen-controlled state) when the first processing mode is being executed and judges that the operational state is a pointer-nonmoving state (screen-uncontrolled state) when the second processing mode is being executed.

The output values of the sensor module 17 correspond to angle-related values such as the angular velocities, the angular accelerations, and the angular acceleration change rates obtained based on the detection signals of the angular velocity sensor unit 15, or velocity-related values such as the accelerations and the acceleration change rates obtained based on the detection signals of the acceleration sensor unit 16. The sensor module 17 outputs the output values corresponding to the movement of the casing 10 of the input apparatus 1. Based on the output values, the MPU 19 can judge a level of the movement (movement velocity) of the input apparatus 1 that is being operated.

The MPU 19 executes the calibration mode as processing for correcting the reference potential by obtaining the output values from the sensor module 17 over a data obtainment period and calculating correction values of the reference potentials based on the obtained output values (calibration means). The MPU 19 sets the data obtainment period based on the judged operation status of the operation button 11 (setting means).

The data obtainment period is a sampling period of the output values output from the sensor module 17, and is set as appropriate based on a frequency band of a signal that is to be obtained from the output of the sensor module 17, an output cycle of the sensor module 17, a calculation cycle of the output values by the MPU 19, and the like. The output values of the sensor module 17 obtained over the data obtainment period in time series include angular velocity values, acceleration values, and the like of the input apparatus 1 with respect to the X' axis and the Y' axis and are stored in a storage section inside (or outside) the MPU 19. Based on the obtained output values of the sensor module 17, the MPU 19 calculates the correction values for correcting the reference potentials of the angular velocity sensors 151 and 152. The correction value calculation method is not particularly limited, and a moving average, a weighted average, or the like of the output values is used, for example.

In particular, in the input apparatus 1 of this embodiment, the MPU 19 includes a first calibration mode as processing for correcting the reference potential of the angular velocity sensors under a first calibration condition, and a second calibration mode as processing for correcting the reference potential of the angular velocity sensors under a second calibration condition less strict than the first calibration condition. The MPU 19 executes the first calibration mode when the first processing mode (pointer movable mode) as the processing for moving the pointer 2 on the screen 3 is being executed, and executes the second calibration mode when the second processing mode (pointer immovable mode) as the processing in which the movement of the pointer 2 is inhibited is being executed.

(Processing Example Of First And Second Calibration Modes)

Figure 15:
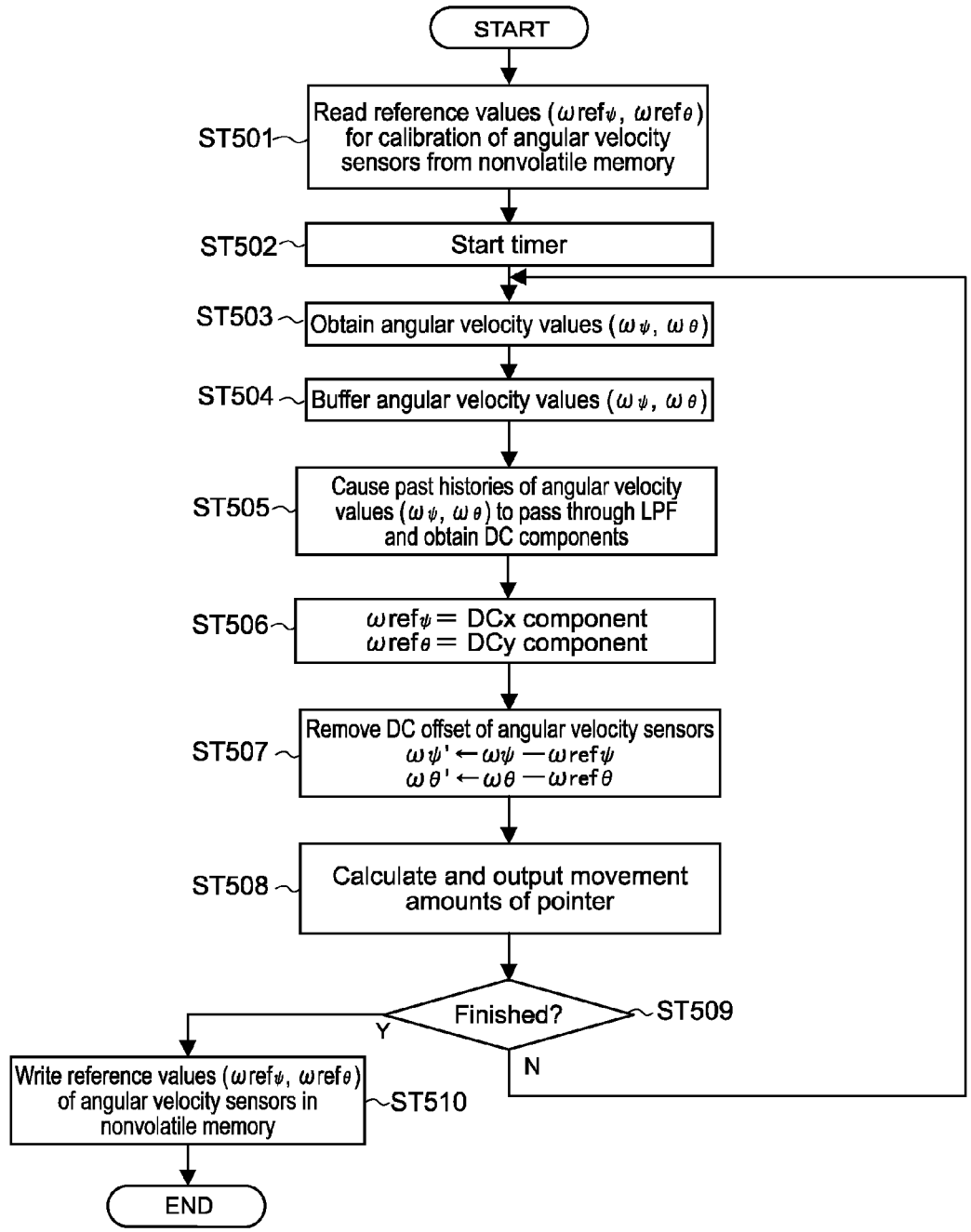
FIG. 15 is a flowchart for illustrating a processing example of first and second calibration modes according to the embodiment.

FIG. 15 is a flowchart schematically showing a calibration method of the angular velocity sensors 151 and 152 executed during the operation of the input apparatus 1 according to the embodiment.

First, reference values (offset values) ($\omega ref_\psi$, $\omega ref_\theta$) of the angular velocity sensors to be a reference for the calibration are read from the nonvolatile memory (storage section) of the MPU 19 (Step 501). Although calibration data obtained as a result of executing the previous calibration mode is used for the reference values ($\omega ref_\psi$, $\omega ref_\theta$), when there is no past calibration data, calibration data initially stored at a time of shipment is used. It should be noted that the reference values ($\omega ref_\psi$, $\omega ref_\theta$) respectively correspond to output potentials of the sensors without the angular velocity signals, that is, reference potentials (Vrefx, Vrefy).

Next, a timer is operated and counting is started (Step 502). A count value obtained by the timer is referenced at a time of setting a cutoff frequency of a lowpass filter (LPF) to be described later, that is used when obtaining the angular velocity signals.

Subsequently, the angular velocity values (angular velocity signals) ($\omega_\psi$, $\omega_\theta$) detected by the angular velocity sensors 151 and 152 are obtained (Step 503). As described above, $\omega_\psi$ corresponds to the angular velocity value about the Y' axis obtained when moving the input apparatus 1 along the X'-axis direction, and $\omega_\theta$ corresponds to the angular velocity value about the X' axis obtained when moving the input apparatus 1 along the Y'-axis direction.

Then, the obtained angular velocity values ($\omega_\psi$, $\omega_\theta$) are buffered (Step 504), the buffered angular velocity values ($\omega_\psi$, $\omega_\theta$) of the past are passed through the lowpass filter, and DC components of the angular velocity signals of the angular velocity sensors are thus calculated (Step 505).

The output signals of the angular velocity sensors 151 and 152 contain signals (AC components) on the movement amounts of the input apparatus 1 (casing 10) operated by the user and reference potential signals (DC components) of the angular velocity sensors 151 and 152. In extracting the DC components from the output signals of the angular velocity sensors, the AC components of the angular velocity signals are sampled, and center values of the outputs are calculated. At this time, the lowpass filter is used for placing a restriction on a sampling signal frequency. A general-purpose electronic component may be used for the lowpass filter, or the lowpass filter may be constituted of an operation algorithm or an internal circuit of the MPU 19. In other words, the expression "the angular velocity values are passed through the lowpass filter" includes calculating a moving average value or a weighted average value of the buffered angular velocity values of the past.

The method of calculating the DC components is not particularly limited. For example, a mean value of the angular velocity values that have passed through the lowpass filter per unit time or regression curves may be obtained to thus calculate the DC components. Here, it is assumed that the center value of the output of the angular velocity sensors is a DC center, that is, a reference potential of the angular velocity sensors.

The cutoff frequency of the lowpass filter can be set as appropriate. In this embodiment, different cutoff frequencies are set for the pointer movable mode (first processing mode) and the pointer immovable mode (second processing mode) of the input apparatus 1. Specifically, when the input apparatus 1 is in the pointer movable mode, a lowpass filter having a first cutoff frequency is used to execute the calibration processing of the angular velocity sensors 151 and 152 (first calibration mode). On the other hand, when the input apparatus 1 is in the pointer immovable mode, a lowpass filter having a second cutoff frequency higher than the first cutoff frequency is used to execute the calibration processing of the angular velocity sensors 151 and 152 (second calibration mode). Here, because the cutoff frequency of the lowpass filter corresponds to the data obtainment period for the output values referenced at the time of calibrating the angular velocity sensors, the first calibration mode is set with a longer data obtainment period than the second calibration mode.

The reason for setting different cutoff frequencies for the pointer movable mode and the pointer immovable mode as described above are as follows. Specifically, in the calibration of the angular velocity sensors (particularly correction of activation drift), if the cutoff frequency is raised or the condition under which the calibration can be performed is set unstrictly, although the calibration in a short time becomes possible, it becomes difficult to distinguish a slow near-constant velocity operation from the static state of the input apparatus, thus resulting in an erroneous detection. On the other hand, if the cutoff frequency is lowered or the condition under which the calibration can be performed is set strictly, although detection accuracy of the reference potential can be enhanced, the calibration takes too much time and it becomes difficult to correct the reference potential at an early stage.

In this regard, in this embodiment, by detecting whether the pointer is movable as described above, it is possible to positively judge whether a slow near-constant velocity operation has been made, based on the user's intention of using the input apparatus 1. Accordingly, calibration accuracy of the angular velocity sensors can be enhanced.

Here, the cutoff frequency for the first calibration mode (first cutoff frequency) executed in the pointer movable mode is set to a frequency domain low enough to exclude the "slow near-constant velocity operation" so that the calibration condition is set strictly (data obtainment period is elongated). As a result, a fear that the "slow near-constant velocity operation" is erroneously detected as the static state can be eliminated. In this case, the data obtainment period can be set longer than a time period required for a slowest operation possible for human beings (e.g., 0.01 Hz or less). Alternatively, a calibration method in which a calibration degree (weighting) is lowered as will be described later, while using a low-frequency domain encompassing the "slow near-constant velocity operation" may be employed.

On the other hand, the cutoff frequency for the second calibration mode (second cutoff frequency) executed in the pointer immovable mode is set to a relatively-high frequency domain encompassing the "slow near-constant velocity operation" so that the calibration condition is set unstrictly (data obtainment period is shortened). This is because this calibration mode aims at improving operability of the input apparatus 1 by readily executing the calibration even with slightly-degraded detection accuracy.

It should be noted that it is also possible that current values are not used for the calibration when a threshold value is set for change amounts (difference between current and previous values) of the angular velocity values and the change amounts are equal to or larger than the threshold value. This is because the angular velocity values obtained under a condition where the movement change is excessively large are not appropriate as data to be reference for the calibration.

Next, DC components (DCx, DCy) of the angular velocity values ($\omega_\psi$, $\omega_\theta$) obtained as described above are set as new reference values ($\omega ref_\psi$, $\omega ref_\theta$) obtained as a result of the calibration (Step 506). Then, by subtracting the new reference values ($\omega ref_\psi$, $\omega ref_\theta$) from the currently-obtained angular velocity values ($\omega_\psi$, $\omega_\theta$), net angular velocity values ($\omega_\psi'$, $\omega_\theta'$) from which DC offset components have been removed are obtained (Step 507).

Based on the thus-obtained angular velocity values ($\omega_\psi'$, $\omega_\theta'$), the MPU 19 calculates the pointer velocity values ($V_x$, $V_y$) using an operation method as shown in FIG. 12, and transmits a movement command (first movement command) to the control apparatus 40 by the same process as that of Step 104 of FIG. 10 (Step 508).

Step 508 shows an example of the process executed in the pointer movable mode in which an ON operation is made to the operation button 11 (movement button 7) of the input apparatus 1. On the other hand, in the pointer immovable mode in which the operation button 11 is not operated, the movement command is not generated or the movement command with the movement amount set to 0 is generated and transmitted to the control apparatus 40.

Steps 503 to 508 are carried out repeatedly until the calibration processing is ended (Step 509). At this time, when the input apparatus 1 is in the pointer immovable mode, it is possible to set the cutoff frequency (second cutoff frequency) of the lowpass filter (Step 505) to gradually decrease in accordance with the count value of the timer (Step 502). In other words, the angular velocity sensors can readily be calibrated even when detection accuracy is rough to some extent at an early stage of the calibration, with the result that the activation drift of the angular velocity sensors can be reduced effectively in particular. In addition, enhancement of calibration accuracy according to progression of the calibration processing leads to maintenance or improvement of the operability of the input apparatus 1. Therefore, causing the cutoff frequency of the lowpass filter to shift to the low-frequency side in accordance with the progression of the calibration enables the calibration to be carried out more accurately, which is extremely useful in terms of practicability. The second cutoff frequency can eventually be fixed to a fixed value. The fixed value may be the first cutoff frequency used in the pointer movable mode or a frequency that is higher than the first cutoff frequency.

It should be noted that when the input apparatus 1 is in the pointer movable mode, the cutoff frequency (first cutoff frequency) of the lowpass filter does not always need to be changed in accordance with the progression of the calibration, but the first cutoff frequency may be changed in the same manner as the second cutoff frequency.

Upon ending the calibration processing, the offset reference values ($\omega ref_\psi$, $\omega ref_\theta$) that have been obtained most recently are written in the nonvolatile memory (storage section) of the MPU 19 and referenced as the reference values at the time of the next calibration (Step 510). It should be noted that the calibration processing ends at times when the input apparatus 1 (or control apparatus 40) is stopped being used, when power of the input apparatus 1 (or control apparatus 40) is cut off, when the mode is shifted to a third calibration mode to be described later, and the like.

Figure 16A:
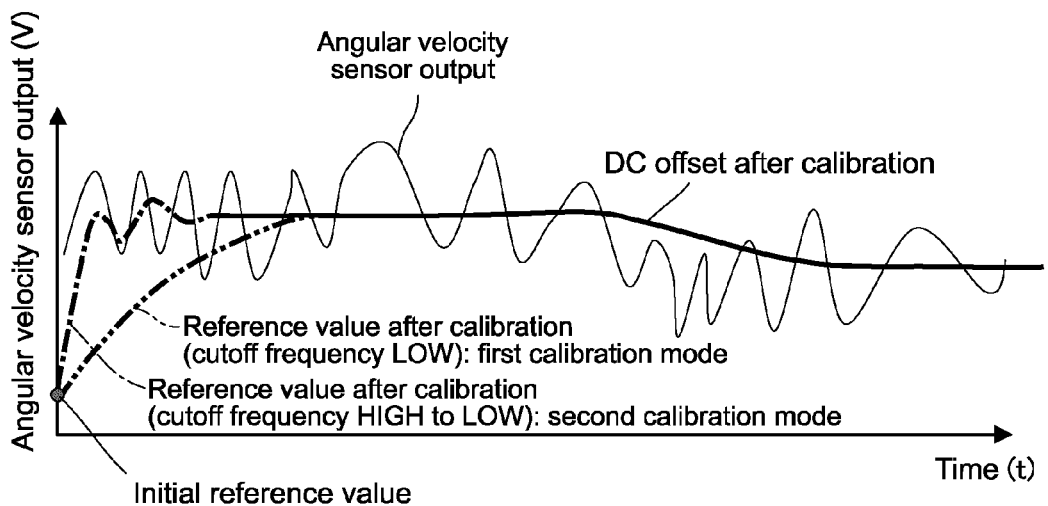
FIG. 16 are diagrams schematically showing a temporal transition of a DC offset of an angular velocity sensor at a time when calibration processing of the input apparatus according to the embodiment is executed, FIG. 16A showing a case where the input apparatus is in a dynamic state and FIG. 16B showing a case where the input apparatus is in a static state.

FIG. 16A schematically shows a transition of the DC offset at a time when the calibration processing of the angular velocity sensors is executed during the operation of the input apparatus 1. As shown in FIG. 16A, as compared to the calibration mode at the time of the pointer movable mode (first calibration mode), the calibration processing of the angular velocity sensors can be executed more readily and following capability with respect to changes in the angular velocity values can be enhanced in the calibration mode at the time of the pointer immovable mode (second calibration mode). This is because the sampling time (data obtainment period) of the angular velocity values is shortened due to the cutoff frequency in the second calibration mode being higher than that in the first calibration mode.

As described above, in the input apparatus 1 of this embodiment, the calibration condition of the angular velocity sensors is changed between the first processing mode (pointer movable mode) in which the pointer 2 is moved on the screen 3 and the second processing mode (pointer immovable mode) in which the movement of the pointer 2 is inhibited. In addition, an operation signal of the operation button 11 (movement button 7) (see FIG. 9) for making a switch between the pointer movable mode and the pointer immovable mode is referenced when switching the calibration condition. As a result, it becomes possible to eliminate erroneous detection since the user's intention of using the input apparatus 1 can be reflected on the detection of the slow near-constant velocity operation, and readily calibrate the angular velocity sensors.

Figure 16B:
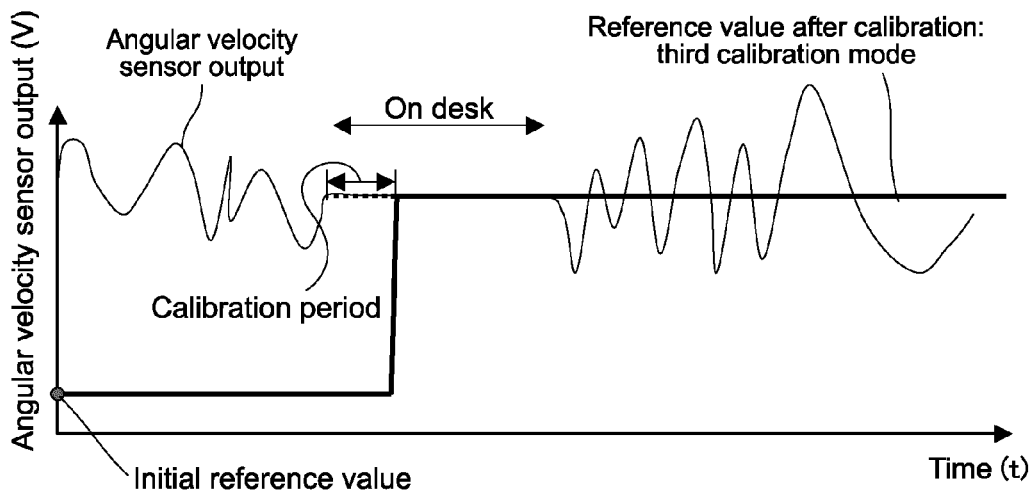

Next, FIG. 16B schematically shows a transition of the DC offset at a time when the calibration processing of the angular velocity sensors is executed in a state where the input apparatus 1 is placed on a desk or the like and is thus static. After it is judged that the input apparatus 1 is in the static state by the angular velocity sensors 151 and 152 or the acceleration sensors 161 and 162, the MPU 19 (calibration means) calibrates the angular velocity sensors 151 and 152 by reading out the reference values for the calibration from the memory. This calibration mode is executed upon detecting that the input apparatus 1 is in the static state (third calibration mode). In this calibration mode, only the reference potentials are output from the angular velocity sensors in the static state. Therefore, by using the output of the angular velocity sensors as it is as the correction values, highly-accurate calibration processing can be realized. The method of calculating correction values is not particularly limited, and a mean value or center value of the sampled outputs can be used.

The input apparatus 1 of this embodiment further includes a sensor to detect the static state thereof (detection means). In the input apparatus 1 shown in FIG. 2, a lower-half area of the casing 10 is constituted as a grip portion G that is held by the user. A proximity sensor 51 that functions as the sensor is provided at a part of the area of the grip portion G. In this embodiment, the proximity sensor 51 is constituted of a capacitance sensor. An output of the proximity sensor 51 is supplied to the MPU 19.

When the output of the proximity sensor 51 corresponds to an output thereof obtained when the user is holding the grip portion G, the MPU 19 recognizes that the user is using the input apparatus 1 and executes the first calibration mode or the second calibration mode. On the other hand, when the output of the proximity sensor 51 corresponds to an output thereof obtained when the user is not holding the grip portion G, the MPU 19 recognizes that the user is not using the input apparatus 1 and switches to execution of the third calibration mode.

A position and (a range of) a detection area of the proximity sensor 51 are not limited as long as the proximity sensor 51 is capable of detecting, at the grip portion G of the casing 10, a state where the user is holding the input apparatus in hand. Further, also considering that the user operates the input apparatus 1 by holding the casing 10 with either the right hand or the left hand, it is also possible to provide the proximity sensor on both the left- and right-hand surfaces of the grip portion G of the casing 10, or provide the proximity sensor in an area where fingers of both the left and right hands touch. Moreover, instead of the capacitance sensor, it is also possible for the proximity sensor 51 to be constituted of, for example, an optical sensor that uses a photo interrupter. Alternatively, instead of the proximity sensor, a pressure sensor that detects an in-contact state or a grip pressure by the method above, or a shake sensor may be used.

On the other hand, the control system 100 of this embodiment includes a notification means for making the user recognize which calibration mode out of the first to third calibration modes is being executed in the input apparatus 1. The notification means can be constituted of, for example, a mode display lamp 61 provided at the upper portion of the casing 10 of the input apparatus 1 as shown in FIG. 2, or a luminescent display means such as a mode display section 62 displayed on the screen 3 of the display apparatus 5 as shown in FIG. 5.

The mode display lamp 61 can be constituted of a monochrome or multicolor LED lamp capable of emitting colored light that can be visually recognized by the user. When the first calibration mode is being executed, the MPU 19 causes the mode display lamp 61 to emit light in a first luminescence pattern, and when the second calibration mode is being executed, causes the mode display lamp 61 to emit light in a second luminescence pattern different from the first luminescence pattern. Similarly, when the third calibration mode is being executed, the MPU 19 causes the mode display lamp 61 to emit light in a third luminescence pattern different from both the first and second luminescence patterns.

The luminescence pattern of the mode display lamp 61 includes a luminescent color, a flash mode, and a flash cycle. For example, when the first and second calibration modes are being executed, red light blinks at a relatively-fast flash cycle, whereas when the third calibration mode is being executed, the mode display lamp 61 is constantly lit in green light.

By differentiating the luminescence pattern of the mode display lamp 61 for each calibration mode, it becomes possible for the user to easily recognize which calibration mode is being executed in the input apparatus 1. Moreover, by notifying the user that the third calibration mode is being executed in the static state, an effect of preventing the user from making an unintentional operation to the input apparatus can be expected, and an appropriate environment for the calibration can thus be maintained.

The mode display section 62 is displayed on the screen 3 together with the icons 4 and the pointer 2 in a form that the user can visually recognize. A display position of the mode display section 62 is not particularly limited and may be displayed at a corner portion of the screen 3, for example. It is of course possible to constitute the mode display section 62 by an icon.

The mode display section 62 is displayed in display patterns that are different for each of the calibration modes. When the first calibration mode is being executed, the MPU 35 (display control means) of the control apparatus 40 displays the mode display section 62 in a first display pattern, and when the second calibration mode is being executed, displays the mode display section 62 in a second display pattern different from the first display pattern. In addition, when the third calibration mode is being executed, the MPU 35 displays the mode display section 62 in a third display pattern different from both the first display pattern and the second display pattern. In this case, the input apparatus 1 transmits an identification signal indicating a mode type to the control apparatus 40 together with the movement command. Based on the received identification signal, the MPU 35 controls display of the mode display section 62.

A display content of the mode display section 62 may be character information or information containing an arbitrary symbol or mark with which the user can distinguish the calibration mode, or a combination of those with characters. Further, the mode display section 62 may be displayed in a color different for each calibration mode, or may be displayed while blinking differently for each calibration mode.

By differentiating the display pattern of the mode display section 62 for each of the calibration modes, it becomes possible for the user to visually recognize which calibration mode is being executed in the input apparatus 1. Moreover, by notifying the user that the third calibration mode is being executed in the static state, an effect of preventing the user from making an unintentional operation to the input apparatus can be expected, and an appropriate environment for the calibration can thus be maintained.

Instead of being displayed on the screen 3 of the display apparatus 5, the mode display section 62 may be provided to a casing of the control apparatus 40 or displayed on a display section of the control apparatus 40.

The notification means is not limited to the luminescent display means such as the mode display lamp 61 and the mode display section 62 described above. For example, the notification means can be constituted of a sound generation means such as a speaker. In addition, it is also possible to constitute the notification means by a combination of the luminescent display means and the sound generation means. The sound generation means may be incorporated in the input apparatus 1 or the control apparatus 40, or may be constituted of a speaker of the display apparatus 5.

When the sound generation means is incorporated in the input apparatus 1, the MPU 19 causes the sound generation means to generate sound in a first sound pattern when the first calibration mode is being executed, and causes the sound generation means to generate sound in a second sound pattern different from the first sound pattern when the second calibration mode is being executed. Similarly, the MPU 19 causes the sound generation means to generate sound in a third sound pattern different from both the first sound pattern and the second sound pattern when the third calibration mode is being executed.

Further, when the sound generation means is incorporated in the control apparatus 40, the MPU 35 causes the sound generation means to generate sound in the first sound pattern when the first calibration mode is being executed, and causes the sound generation means to generate sound in the second sound pattern different from the first sound pattern when the second calibration mode is being executed. Similarly, the MPU 35 causes the sound generation means to generate sound in a third sound pattern different from both the first sound pattern and the second sound pattern when the third calibration mode is being executed.

Furthermore, when the sound generation means is constituted of the speaker of the display apparatus 5, the MPU 35 causes the speaker to generate sound in the first, second, or third sound pattern depending on the calibration mode. In this case, the MPU 35 generates not only a display control signal but also a predetermined sound signal corresponding to the mode type, and outputs the signal to the display apparatus 5. Examples of the sound signal include an audio signal and a musical sound signal.

By generating sound in the sound patterns different for each of the calibration modes, it becomes possible for the user to auditorily recognize which calibration mode is being executed in the input apparatus 1. Moreover, by notifying the user that the third calibration mode is being executed in the static state, an effect of preventing the user from making an unintentional operation to the input apparatus can be expected, and an appropriate environment for the calibration can thus be maintained.

(Processing Example Of Third Calibration Mode)

Figure 17:
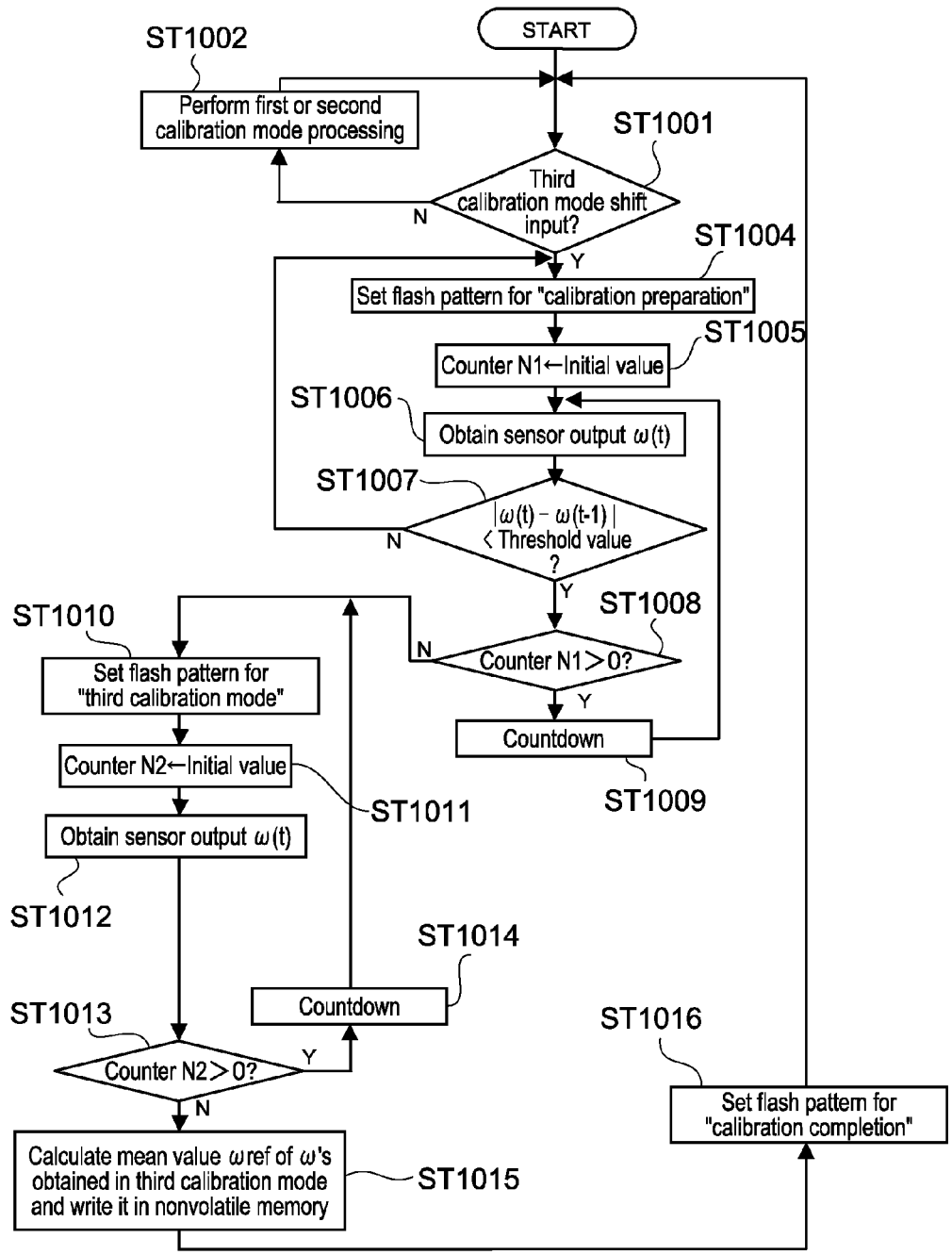
FIG. 17 is a flowchart for illustrating a processing example of a third calibration mode according to the embodiment.

Next, an embodiment of the third calibration mode will be described. FIG. 17 is a calibration flow of the sensor module 17 carried out by the MPU 19. The example in the figure shows the calibration processing of the angular velocity sensor unit 15, but the same applies to the calibration processing of the acceleration sensor unit 16.

In Step 1001, it is judged whether an operational mode of the input apparatus 1 can be shifted to the third calibration mode. This judgment is made based on the output of the proximity sensor 51. When it is judged that the input apparatus 1 is in the first or second calibration mode based on the output of the proximity sensor 51, the mode display lamp 61 is caused to emit light in the first or second luminescence pattern, and processing of the first or second calibration mode is executed (continued) (Step 1002). The first or second calibration mode of the input apparatus 1 corresponds to the operational example described with reference to FIG. 15. The processes of Steps 1001 and 1002 are continued until the input apparatus 1 shifts to the third calibration mode.

Assuming that the user has stopped operating the input apparatus 1 and has placed the input apparatus 1 on a static support pedestal (support means) such as a table, a battery charger, or a dedicated stand, since the input apparatus 1 is released from the hand of the user, an output corresponding to the output obtained when the user is not holding the casing 10 is normally transmitted from the proximity sensor 51. Based on the output of the proximity sensor 51, the MPU 19 switches the operational mode of the input apparatus 1 from the first or second calibration mode to the third calibration mode (Step 1001).

In this embodiment, the third calibration mode is constituted of a calibration preparation mode and a subsequent calibration processing mode. The calibration preparation mode is for judging the static state of the casing 10. Normally, when the input apparatus 1 is released from the hand of the user, for the time being, the output of the sensor module 17 is unstable due to an effect of inertia and the like. Therefore, if the calibration is started during this period, high calibration accuracy cannot be obtained. In this regard, in this embodiment, instead of starting the calibration processing immediately after the shift to the third calibration mode, a calibration preparation period for stabilizing the output of the sensor module 17 is provided so that the calibration can be carried out appropriately.

Referring to FIG. 17, an example of the calibration preparation mode will be described.

First, after the input apparatus 1 has shifted to the third calibration mode, the mode display lamp 61 is caused to emit light in the third luminescence pattern (Step 1004). Here, as the third luminescence pattern, three patterns of a luminescence pattern for the calibration preparation mode, a luminescence pattern for the calibration processing, and a luminescence pattern for calibration completion are prepared additionally. In Step 1004, the mode display lamp 61 is caused to emit light in the luminescence pattern for the calibration preparation mode.

Next, a predetermined initial counter value N1 that defines a set period of the calibration preparation mode is set (Step 1005). A magnitude of the counter value N1 is arbitrary, and the value can be set as appropriate. The larger the counter value N1 becomes, the longer the calibration preparation period becomes.

Subsequently, the angular velocity values ($\omega_\psi$, $\omega_\theta$) as detection signals (output values) of the angular velocity sensor unit 15 are obtained (Step 1006). Here, the angular velocity values $\omega_\psi$ and $\omega_\theta$ of the angular velocity sensor unit 15 will collectively be represented by $\omega$. It should be noted that $\omega_\psi$ and $\omega_\theta$ may be corrected either individually or collectively. The obtained angular velocity values are stored in the memory of the MPU 19.

Next, it is judged whether a difference (absolute value) between the currently-obtained angular velocity value $\omega(t)$ and the previously-obtained angular velocity value $\omega(t-1)$, that is, an angular velocity time change rate (angular acceleration) is smaller than a predetermined threshold value Vth1 (Step 1007). Since it can be assumed that the input apparatus 1 is in the static state or a near-static state during the calibration preparation period, the difference between $\omega(t)$ and $\omega(t-1)$ is smaller than that in the first or second calibration mode. Therefore, a relatively-small value can be set for the threshold value Vth1.

When the difference between the angular velocity values is equal to or larger than the threshold value Vth1, it is judged that the input apparatus 1 is not in the static state or the near-static state, and the process returns to Step 1004. When the difference between the angular velocity values is smaller than the threshold value Vth1, the process advances to Step 1008 and a judgment is made on whether the counter value N1 has reached 0. When the counter value N1 has not yet reached 0, N1 is decremented a predetermined amount (Step 1009) and the process returns to Step 1006. After that, the same processes as those above are executed again (Steps 1006 to 1008).

The calibration preparation mode is executed as described above. The calibration preparation mode is continued until the counter value N1 reaches 0. At a point when the counter value N1 has reached 0, the calibration processing mode is started (Steps 1010 to 1016).

Hereinafter, the calibration processing mode will be described. After the shift to the calibration processing mode, the mode display lamp 61 is caused to emit light in the luminescence pattern for the calibration processing mode out of the third luminescence pattern (Step 1010). The luminescence pattern for the calibration processing mode is different from the luminescence pattern for the calibration preparation mode described above (in color, flash cycle, and the like).

Next, a predetermined initial counter value N2 that defines a set period of the calibration processing mode is set (Step 1011). A magnitude of the counter value N2 is arbitrary, and the value can be set as appropriate. The larger the counter value N2 is, the larger the sample count of reference angular velocity values used for the calibration becomes, resulting in an enhancement of calibration accuracy. However, processing period for the calibration is elongated.

Here, since the user is not operating the input apparatus 1 when the input apparatus 1 is in the static state, the output values output from the angular velocity sensor unit 15 do not include movement components of the casing 10 caused by the user operation. Therefore, the counter value N2 can be set so that the data obtainment period of the third calibration mode becomes equal to or shorter than the data obtainment period of the second calibration mode. Highly-accurate calibration processing can also be realized under the condition as described above.

Subsequently, the angular velocity data ω ($\omega_\psi$, $\omega_\theta$) output from the angular velocity sensor unit 15 is obtained (Step 1012). The obtained angular velocity values are stored in the memory (storage section) of the MPU 19. While the calibration processing mode is being executed, the static state of the input apparatus 1 is almost completely guaranteed since the calibration preparation mode has already been executed. Therefore, the angular velocities output from the angular velocity sensor unit 15 at this time become 0, that is, values almost equal to the reference potential.

After the obtained angular velocity data is stored in the memory, the process advances to Step 1013 and a judgment is made on whether the counter value N2 has reached 0. When the counter value N2 has not yet reached 0, the counter value N2 is decremented a predetermined amount (Step 1014) and the process returns to Step 1010. After that, the same processes as those above are executed again (Steps 1011 to 1013).

The angular velocity data is repeatedly obtained until the counter value N2 reaches 0. When the counter value N2 has reached 0, the MPU 19 calculates a mean value (ωref) of the obtained pieces of angular velocity data, and stores the value in the memory (Step 1015). The stored mean value (ωref) of the angular velocity data is applied as a correction value of the reference potential Vref.

The calibration processing mode is executed as described above. After the correction values are stored in the memory, the mode display lamp 61 of the input apparatus 1 is caused to emit light in the luminescence pattern for the calibration completion out of the third luminescence pattern (Step 1016), and the process returns to Step 1001. After that, the processes above are executed again.

(Another Processing Example (Processing Example 1) of first and Second calibration modes)

Figure 18:
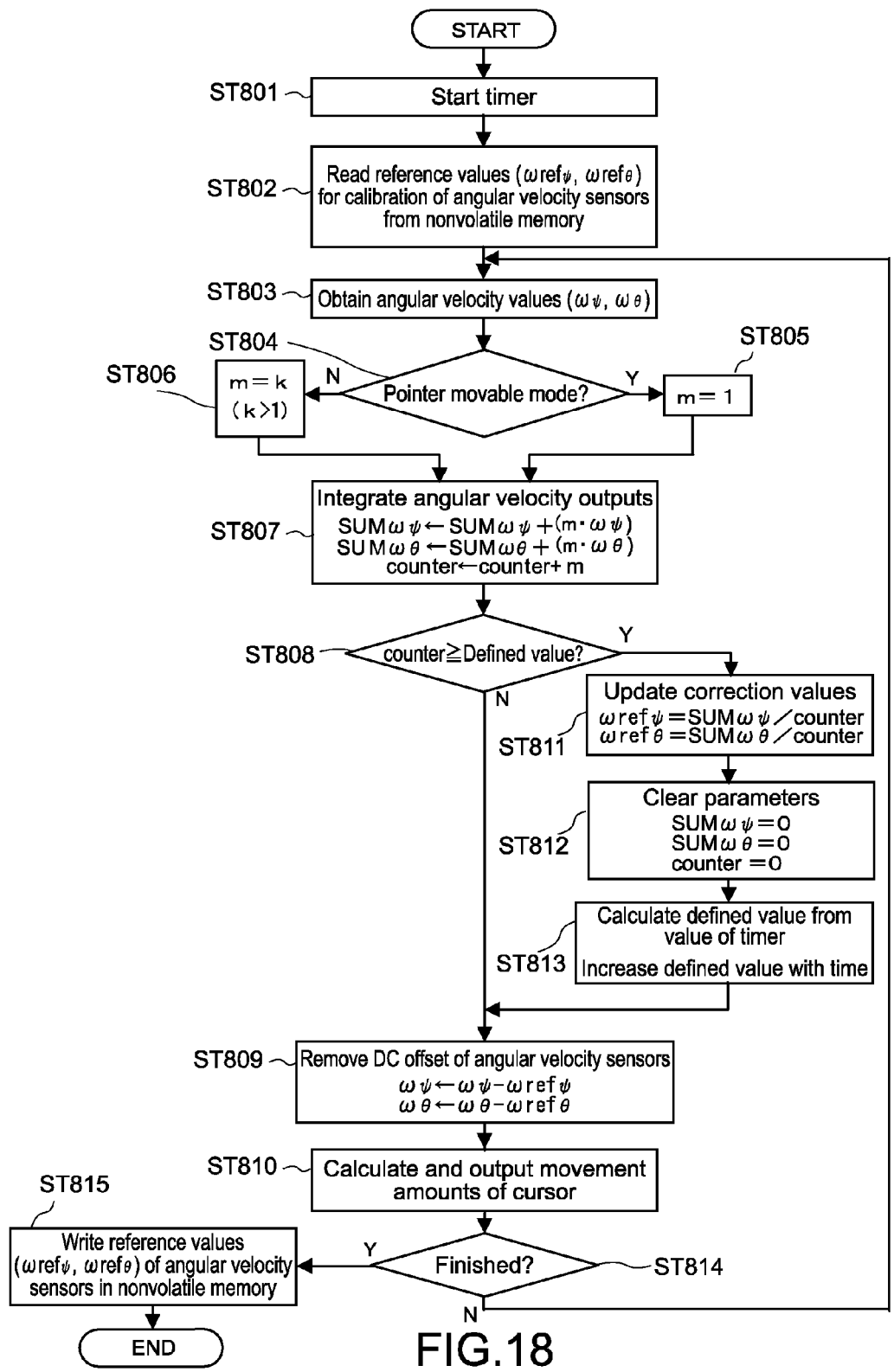
FIG. 18 is a flowchart for illustrating a processing example of the first and second calibration modes according to another embodiment.

Next, with reference to FIG. 18, another processing example of the first and second calibration modes executed during the operation of the input apparatus 1 will be described. FIG. 18 is a flowchart showing a calibration flow in which the correction values of the angular velocity sensors are calculated by obtaining mean values of the output values of the angular velocity sensors at an arbitrary time.

The timer is operated as the power of the input apparatus 1 is turned on (Step 801). The timer times a time since the start of the calibration processing (or activation of the input apparatus 1), which is referenced when a parameter (defined counter value) used for updating the correction values is calculated as will be described later (Step 813). The defined counter value is set so as to gradually increase as time elapses since the start of the calibration (or activation).

Next, reference values (offset values) ($\omega\text{ref}_\psi$, $\omega\text{ref}_\theta$) of the angular velocity sensors to be a reference for the calibration is read from the nonvolatile memory (storage section) of the MPU 19 (Step 802). Although calibration data obtained as a result of executing the previous calibration mode is used for the reference values ($\omega\text{ref}_\psi$, $\omega\text{ref}_\theta$), when there is no past calibration data, calibration data initially stored at a time of shipment is used.

Subsequently, angular velocity values (angular velocity signals, output values) detected by the angular velocity sensors 151 and 152 are obtained (Step 803).

Next, it is judged whether the operational mode of the input apparatus 1 is the pointer movable mode (Step 804). This judgment is made based on the detection signal of the operation button 11 (movement button 7). Specifically, the operational mode is judged to be the pointer movable mode when the detection signal of the movement button 7 is ON, and the operational mode is judged to be the pointer immovable mode when the detection signal of the movement button 7 is OFF.

As a result of the judgment, a constant m is set to 1 at the time of the pointer movable mode, and the constant m is set to k (>1) at the time of the pointer immovable mode (Steps 805 and 806). The constant m is a parameter for determining the sampling period (data obtainment period) of the angular velocity values for the calibration as will be described later, and the sampling period becomes shorter as m increases. In other words, the constant m corresponds to the cutoff frequency of the lowpass filter, and the cutoff frequency increases as m increases.

Next, the obtained angular velocity values ($\omega_\psi$, $\omega_\theta$) are buffered and integrated for each $\omega_\psi$ component and $\omega_\theta$ component (Step 807). In the integration, the current angular velocity values are multiplied by the constant m set as described above. Then, an additionally-prepared counter is incremented only by the constant m in parallel to the integration of the angular velocity values (Step 807).

Next, it is judged whether the counter value has reached the defined value (Step 808). When judged that the counter value has not yet reached the defined value, the reference values ($\omega\text{ref}_\psi$, $\omega\text{ref}_\theta$) read out from the memory are subtracted from the currently-obtained angular velocity values ($\omega_\psi$, $\omega_\theta$), to thus obtain net angular velocity values from which DC offset components have been removed (Step 809).

While the pointer movable mode (first calibration mode) is being executed, the MPU 19 calculates the pointer velocity values ($V_x$, $V_y$) using an operational method as shown in FIG. 12 based on the thus-obtained angular velocity values, and transmits a movement command (first movement command) to the control apparatus 40 by the same process as in Step 104 shown in FIG. 10 (Step 810). On the other hand, while the pointer immovable mode (second calibration mode) is being executed, the MPU 19 does not generate the movement command or generates a movement command with the movement amount set to 0 and transmits it to the control apparatus 40.

While the calibration mode is being executed, the MPU 19 successively obtains the angular velocity values ($\omega_\psi$, $\omega_\theta$), integrates the angular velocity values ($\omega_\psi$, $\omega_\theta$), and repeats the processes described above (Steps 814 and 803 to 810). Then, at the time point when the counter value has reached the defined value, the MPU 19 updates the reference values ($\omega\text{ref}_\psi$, $\omega\text{ref}_\theta$) for the calibration (Steps 808 and 811).

For an update value of the reference values, a value obtained by dividing an integration value of the angular velocity values obtained up to now by the current counter value, that is, a weighted average value is used. After that, the integration values of the angular velocity values ($\omega_\psi$, $\omega_\theta$) (SUM $\omega_\psi$, SUM$\omega_\theta$) and the counter value are reset to 0 (Step 812), and the defined value of the counter is set again (Step 813). The defined value is set with reference to the timer (Step 801) so that a larger value is set as the lapse time becomes longer (Step 813). As a result, the data obtainment period is elongated in accordance with the lapse time since the activation of the input apparatus 1. Alternatively, the defined counter value may be fixed after an elapse of a certain time period.

Next, the angular velocity values from which the DC offset components have been removed are obtained by subtracting the new reference values ($\omega\text{ref}_\psi$, $\omega\text{ref}_\theta$) calculated as described above from the currently-obtained angular velocity values ($\omega_\psi$, $\omega_\theta$) (Step 809). The updated reference values ($\omega\text{ref}_\psi$, $\omega\text{ref}_\theta$) of the angular velocities are values calculated based on past values of the angular velocity values. Specifically, as compared to the case of the reference values (memory values) used for the calibration at an early stage, since the actual angular velocity values are reflected, the calibration processing can be carried out with higher accuracy.

Further, because the constant m is larger in the pointer immovable mode (second calibration mode) than in the pointer movable mode (first calibration mode), the time required for the counter value to reach the defined value and an update cycle of the correction values become shorter. Therefore, the calibration of the angular velocity sensors can be executed more readily in the second calibration mode than in the first calibration mode.

On the other hand, the update cycle of the correction values in the first calibration mode is set to a time period long enough to exclude the "slow near-constant velocity operation", thus strictly setting the calibration condition. As a result, a fear that the "slow near-constant velocity operation" is erroneously detected as the static state can be eliminated. Specifically, the update cycle can be set to be longer than a time period required for a slowest operation possible for human beings (e.g., 0.01 Hz or less).

Furthermore, according to this embodiment, a lowpass filter function with a low cutoff frequency (long sampling time) can be realized while barely taking up space of a buffer memory, with the result that memory-saving of the MPU 19 can be realized.

Upon ending the calibration processing, the offset reference values ($\omega\text{ref}_\psi$, $\omega\text{ref}_\theta$) obtained most recently are written in the nonvolatile memory (storage section) of the MPU 19 to be referenced as the reference values at the time of the next calibration (Step 815).

(Another Processing Example (Processing Example 2) of first and Second calibration modes)

Figure 19:
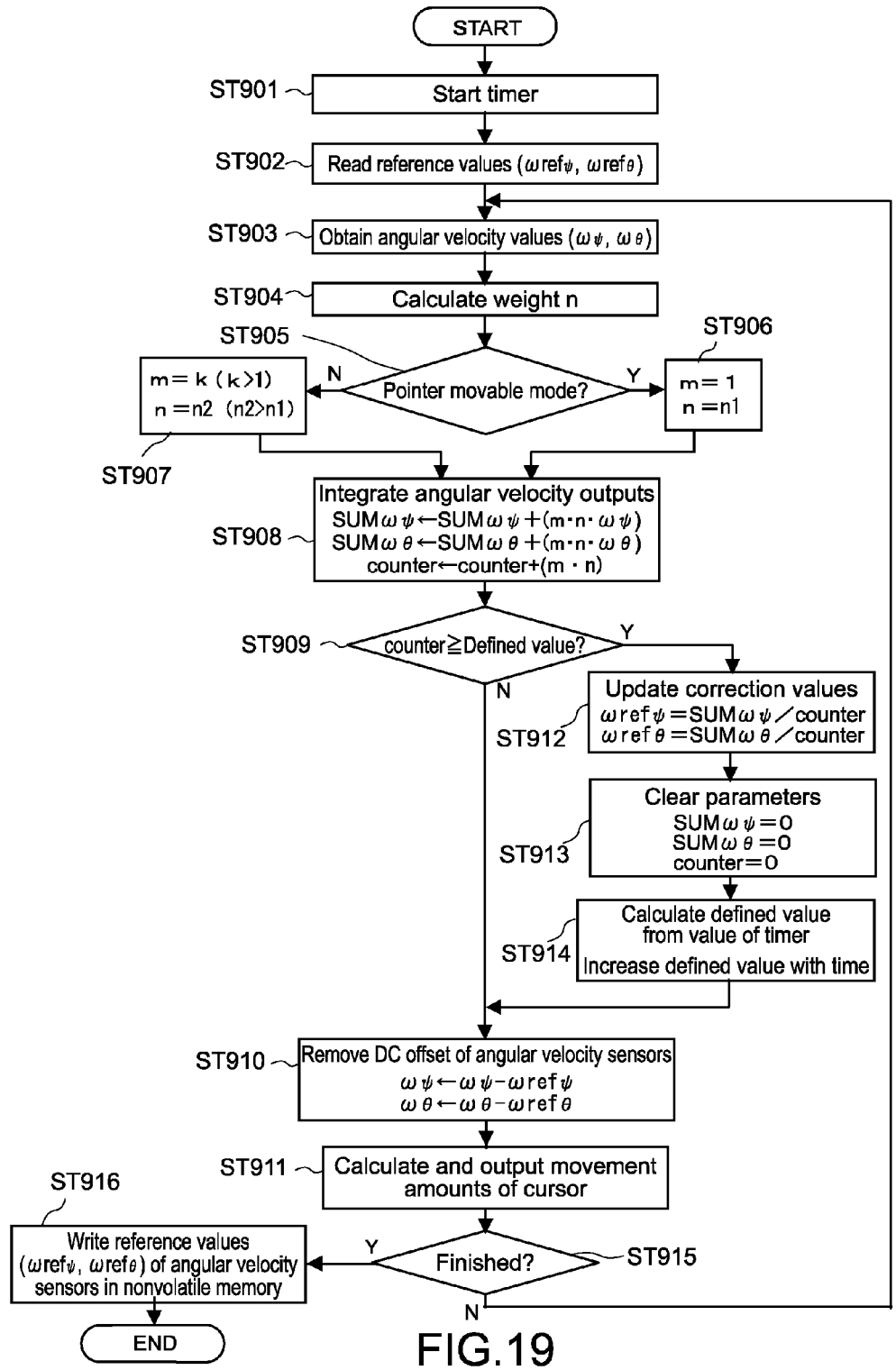
FIG. 19 is a flowchart for illustrating a processing example of the first and second calibration modes according to still another embodiment.

Next, another processing example of the first and second calibration modes executed during the operation of the input apparatus 1 will be described with reference to FIG. 19. In this example, on the basis of the processing example described with reference to FIG. 18, the calibration degree (weighting) is differentiated between the first calibration mode and the second calibration mode.

The timer is operated as the power of the input apparatus 1 is turned on (Step 901). The timer times a time since the start of the calibration processing (or activation of the input apparatus 1), which is referenced when a parameter (defined counter value) used for updating the correction values is calculated as will be described later (Step 914). The defined counter value is set so as to gradually increase as time elapses since the start of the calibration (or activation).

Next, reference values (offset values) ($\omega\text{ref}_\psi$, $\omega\text{ref}_\theta$) of the angular velocity sensors that are to be the reference for the calibration are read from the nonvolatile memory (storage section) of the MPU 19 (Step 902). Subsequently, the angular velocity values (angular velocity signals, output values) ($\omega_\psi$, $\omega_\theta$) detected by the angular velocity sensors 151 and 152 are obtained (Step 903).

Then, a weight n is calculated (Step 904). The obtained angular velocity values ($\omega_\psi$, $\omega_\theta$) or angular velocity value change amounts ($\Delta\omega_\psi$, $\Delta\omega_\theta$) can be referenced when calculating the weight n. For example, because changes in the movement of the input apparatus 1 (casing 10) are smaller with smaller angular velocity value change amounts, the weight n is set larger than that in a case where the angular velocity value change amounts are large. By thus increasing a contribution degree of the current values with respect to the correction values as the input apparatus 1 is closer to the static state, highly-accurate calibration processing can be realized. In this case, when a threshold value (first threshold value) is set for the angular velocity value change amounts and the angular velocity value change amounts are equal to or smaller than the threshold value, the weight n is set larger than that in the case where the angular velocity value change amounts are larger than the threshold value. A plurality of threshold values may be set, and the weight n may be determined based on which range of the threshold values the obtained angular velocity value change amounts belong to.

Furthermore, it is also possible to set a larger weight n in a case where signs of the obtained angular velocity values are inverted compared to the previous values, than in a case where the signs are not inverted. In other words, inversions of the signs of the angular velocity values in short cycles mean that a hand movement of the user is being detected or values close to the reference potentials are being output from the angular velocity sensors. Since it can be assumed that the input apparatus 1 is in the static state in this case, by referencing the output values obtained at this time, highly-accurate calibration processing can be realized.

Instead of or in addition to the output of the angular velocity sensors, output change amounts of the acceleration sensor unit 16 may be referenced in calculating the weight n. The weight n is increased as the obtained acceleration value change amounts become smaller. Also in this case, when a threshold value (second threshold value) is set for the acceleration value change amounts and the acceleration value change amounts are equal to or smaller than the threshold value, the weight n is set larger than that in the case where the acceleration value change amounts are larger than the threshold value. A plurality of threshold values may be set, and the weight n may be determined based on which range of the threshold values the obtained acceleration value change amounts belong to.

Here, it is possible that, when the angular velocity value change amounts or the acceleration value change amounts reach a value equal to or larger than a certain set value that is larger than the first and second threshold values, those angular velocity values or the acceleration values are not used for the calibration. This is because the angular velocity values or the acceleration values obtained under a condition where the movement of the input apparatus 1 (casing 10) is excessively large are low in reliability such that the values cannot be referenced as the correction values.

Next, it is judged whether the operational mode of the input apparatus 1 is the pointer movable mode (Step 905). This judgment is made based on the detection signal of the operation button 11 (movement button 7). Specifically, the operational mode is judged to be the pointer movable mode when the detection signal of the movement button 7 is ON, and the operational mode is judged to be the pointer immovable mode when the detection signal of the movement button 7 is OFF.

As a result of the judgment, the constant m is set to 1 at the time of the pointer movable mode, and the constant m is set to k (>1) at the time of the pointer immovable mode (Steps 906 and 907). The constant m is a parameter for determining the sampling period of the angular velocity values for the calibration as will be described later, and the sampling period becomes shorter as m increases. In other words, the constant m corresponds to the cutoff frequency of the lowpass filter, and the cutoff frequency increases as m increases.

Moreover, in the case of the pointer movable mode, the weight n is set smaller than that in the pointer immovable mode. The weight n is eventually determined after the judgment is made on whether the operational mode is the pointer movable mode. The magnitude of the weight n can be set as appropriate, and a difference between the weights n among the modes is also not particularly limited.

Next, the obtained angular velocity values ($\omega_\psi$, $\omega_\theta$) are buffered and integrated for each $\omega_\psi$ component and $\omega\theta$ component (Step 908). In the integration, the current angular velocity values are multiplied by the constant m and the weight n that have been set as described above. Then, an additionally-prepared counter is incremented only by a product of the constant m and the weight n (m*n) in parallel to the integration of the angular velocity values (Step 908).

Next, it is judged whether the counter value has reached the defined value (Step 909). When judged that the counter value has not yet reached the defined value, the reference values ($\omega ref_\psi$, $\omega ref_\theta$) read out from the memory are subtracted from the currently-obtained angular velocity values ($\omega_\psi$, $\omega_\theta$), to thus obtain net angular velocity values from which the DC offset components have been removed (Step 910).

While the pointer movable mode (first calibration mode) is being executed, the MPU 19 calculates the pointer velocity values ($V_x$, $V_y$) using an operational method as shown in FIG. 12 based on the thus-obtained angular velocity values, and transmits a movement command (first movement command) to the control apparatus 40 by the same process as in Step 104 shown in FIG. 10 (Step 911). On the other hand, while the pointer immovable mode (second calibration mode) is being executed, the MPU 19 does not generate the movement command or generates a movement command with the movement amount set to 0 and transmits it to the control apparatus 40.

While the calibration mode is being executed, the MPU 19 successively obtains the angular velocity values ($\omega_\psi$, $\omega_\theta$), integrates the angular velocity values ($\omega_\psi$, $\omega_\theta$), and repeats the processes described above (Steps 915 and 903 to 911). Then, at the time point when the counter value has reached the defined value, the MPU 19 updates the reference values ($\omega ref_\psi$, $\omega ref_\theta$) for the calibration (Steps 909 and 912).

For an update value of the reference values, a value obtained by dividing an integration value of the angular velocity values obtained up to now by the current counter value, that is, a mean value is used. After that, the integration values of the angular velocity values ($\omega_\psi$, $\omega_\theta$) (SUM $\omega_\psi$, SUM$\omega_\theta$) and the counter value are reset to 0 (Step 913), and the defined value of the counter is set again (Step 914). The defined value is set with reference to the timer (Step 901) so that a larger value is set as the lapse time becomes longer (Step 914). As a result, the data obtainment period is elongated in accordance with the lapse time since the activation of the input apparatus 1. Alternatively, the defined counter value may be fixed after an elapse of a certain time period.

Next, the angular velocity values from which the DC offset components have been removed are obtained by subtracting the new reference values ($\omega ref_\psi$, $\omega ref_\theta$) calculated as described above from the currently-obtained angular velocity values ($\omega_\psi$, $\omega_\theta$) (Step 910). The updated reference values ($\omega ref_\psi$, $\omega ref_\theta$) of the angular velocities are values calculated based on the past values the angular velocity values. Specifically, as compared to the case of the reference values (memory values) used for the calibration at an early stage, since the actual angular velocity values are reflected, the calibration processing can be carried out with higher accuracy. In addition, since the calibration degree corresponding to the magnitude of the weight n is reflected, it becomes possible to realize appropriate calibration processing that corresponds to the actual operation of the input apparatus 1.

Further, because the constant m and the weight n are larger in the pointer immovable mode (second calibration mode) than in the pointer movable mode (first calibration mode), the time required for the counter value to reach the defined value and an update cycle of the correction values become shorter. Therefore, the calibration of the angular velocity sensors can be executed more readily in the second calibration mode than in the first calibration mode.

On the other hand, the update cycle of the correction values in the first calibration mode is set to a time period long enough to exclude the "slow near-constant velocity operation", thus strictly setting the calibration condition. As a result, a fear that the "slow near-constant velocity operation" is erroneously detected as the static state can be eliminated. Specifically, the update cycle can be set to be longer than a time required for a slowest operation possible for human beings (e.g., 0.01 Hz or less).

Furthermore, according to this embodiment, a lowpass filter function with a low cutoff frequency (long sampling time) can be realized while barely taking up space of a buffer memory, with the result that memory-saving of the MPU 19 can be realized.

Upon ending the calibration processing, the offset reference values ($\omega ref_\psi$, $\omega ref_\theta$) obtained most recently are written in the nonvolatile memory (storage section) of the MPU 19 to be referenced as the reference values at the time of the next calibration (Step 916).

According to the calibration processing example above, the calibration of the angular velocity sensors 151 and 152 can be carried out more readily in the case of moving the input apparatus 1 slowly than in the case of moving the input apparatus 1 speedily. Moreover, even when a drift is caused in the reference potentials of the angular velocity sensors 151 and 152 during the operation of the input apparatus 1, the activation drift can be converged in a short time, thus making it possible to prevent lowering of operability in moving the pointer 2. The same effect as described above can also be obtained when the angular velocity sensors are calibrated while minutely vibrating the input apparatus 1.

[Second Embodiment]

Next, a second embodiment will be described. It should be noted that the same components as those of the first embodiment above are denoted by the same reference symbols, and descriptions thereof will be omitted.

(Structure of Input Apparatus)

The input apparatus 1 of this embodiment includes the casing 10, the sensor module 17 as the sensor unit, and the MPU 19 as the velocity calculation unit. The sensor module 17 includes the angular velocity sensor unit 15 and the acceleration sensor unit 16 that each output, as a detection signal, a fluctuation of a potential with respect to the reference potential, that corresponds to the movement of the casing 10. As described above, the MPU 19 has a function of executing the first processing mode as processing for calculating the pointer velocity values ($V_x$, $V_y$) that are velocity values for moving the pointer 2 based on the detection signals (output values) of the sensor module 17, and moving the pointer 2 on the screen 3 in accordance with the pointer velocity values.

In addition, the MPU 19 has a function of executing a calibration mode as processing for correcting the reference potential of the sensors (calibration means). The MPU 19 also includes the following function for executing the calibration function.

Specifically, the MPU 19 has a function of judging the operational state of the input apparatus 1 based on the output values of the sensor module 17 and the like judgment means). The output values of the sensor module 17 correspond to the angle-related values such as the angular velocities, the angular accelerations, and the angular acceleration change rates obtained based on the detection signals of the angular velocity sensor unit 15, or the velocity-related values such as the accelerations and the acceleration change rates obtained based on the detection signals of the acceleration sensor unit 16. The sensor module 17 outputs the output values corresponding to the movement of the casing 10 of the input apparatus 1. Based on the output values, the MPU 19 judges whether the input apparatus 1 is in the static state where the input apparatus 1 is not operated by the user or is in the operated state where the input apparatus 1 is operated by the user. Moreover, based on the output values, the MPU 19 can judge a level of the movement (movement velocity) of the input apparatus 1 that is being operated.

The MPU 19 executes the calibration mode as processing for correcting the reference potentials by obtaining the output values from the sensor module 17 over the data obtainment period and calculating the correction values of the reference potentials based on the obtained output values (calibration means). The MPU 19 sets the data obtainment period based on the judged operational state of the input apparatus 1 (setting means). The output values of the sensor module 17 obtained over the data obtainment period in time series include the angular velocity values, the acceleration values, and the like of the input apparatus 1 with respect to the X' axis and the Y' axis and are stored in the storage section inside (or outside) the MPU 19. Based on the obtained output values of the sensor module 17, the MPU 19 calculates the correction values for correcting the reference potentials of the angular velocity sensors 151 and 152. The correction value calculation method is not particularly limited, and a moving average, a weighted average, or the like of the output values is used, for example.

Figure 20:
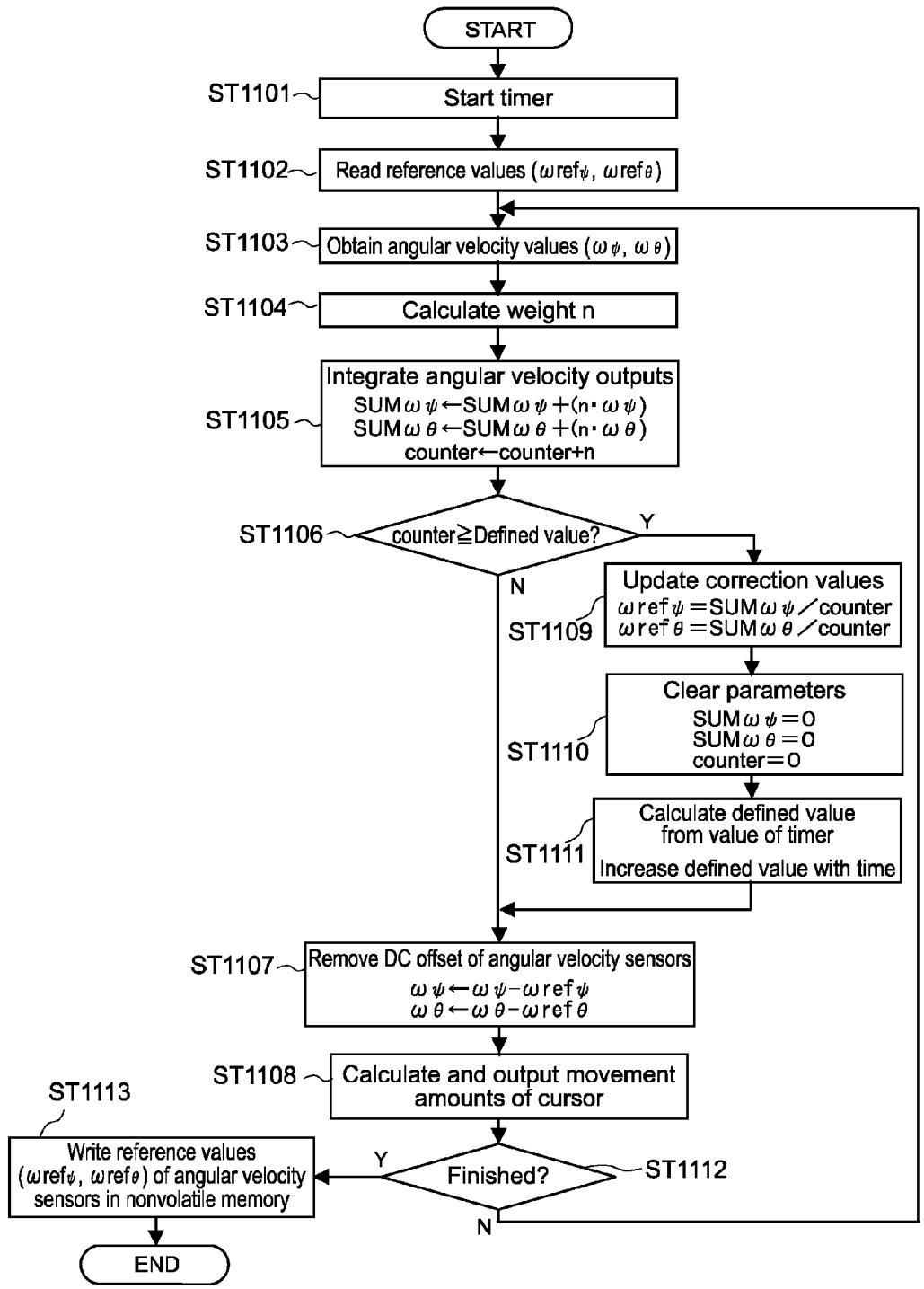
FIG. 20 is a flowchart for illustrating a processing example of a calibration mode of the input apparatus according to still another embodiment.

FIG. 20 is a flowchart showing a processing example of the calibration mode executed during the operation of the input apparatus 1. In this embodiment, a description will be given on the processing example in which the data obtainment period for the calibration mode is set based on the output of the angular velocity sensors 151 and 152. In the input apparatus 1 of this embodiment, the operation button 11 is constituted of a 1-step switch in which the first switch is omitted unlike the 2-step switch including the first and second switches as shown in FIG. 9.

(Processing Example 3 of calibration mode)

The timer is operated as the power of the input apparatus 1 is turned on (Step 1101). The timer times a time since the start of the calibration processing (or activation of the input apparatus 1), which is referenced when a parameter (defined counter value) used for updating the correction values is calculated as will be described later (Step 1111). The defined counter value is set so as to gradually increase as time elapses since the start of the calibration (or activation).

Next, reference values (offset values) ($\omega\text{ref}_\psi$, $\omega\text{ref}_\theta$) of the angular velocity sensors that are to be the reference for the calibration are read from the nonvolatile memory (storage section) of the MPU 19 (Step 1102). Subsequently, the angular velocity values (angular velocity signals, output values) ($\omega_\psi$, $\omega_\theta$) detected by the angular velocity sensors 151 and 152 are obtained (Step 1103).

Then, the weight n is calculated (Step 1104). The obtained angular velocity values ($\omega_\psi$, $\omega_\theta$), angular velocity value change amounts (or change rates) ($\Delta\omega_\psi$, $\Delta\omega_\theta$), or the like can be referenced when calculating the weight n. For example, because changes in the movement of the input apparatus 1 (casing 10) are smaller as the angular velocity value change amounts are smaller, the weight n is set larger than that in a case where the angular velocity value change amounts are large. By thus increasing a contribution degree of the current values with respect to the correction values as the input apparatus 1 is closer to the static state, highly-accurate calibration processing can be realized. In this case, when a threshold value (first threshold value) is set for the angular velocity value change amounts and the angular velocity value change amounts are equal to or smaller than the threshold value, the weight n is set larger than that in the case where the angular velocity value change amounts are larger than the threshold value. A plurality of threshold values may be set, and the weight n may be determined based on which range of the threshold values the obtained angular velocity value change amounts belong to. It is also possible to set a plurality of operation statuses having different weights n in advance and select the operation status that corresponds to the obtained angular velocity values.

At this time, when the obtained angular velocity values are extremely large, a large error may be caused in the correction values to be calculated. In this case, the weight n may be decreased, or a threshold value may be determined so that the angular velocity values equal to or larger than the threshold value are not used for calculating the correction values. On the other hand, when the obtained angular velocity values are extremely small, there is a possibility that the input apparatus is being operated slowly at a low frequency like the "slow near-constant velocity operation" in the operation of moving the pointer, for example. In this case, the weight n may be decreased, or a threshold value may be determined so that the angular velocity values equal to or smaller than the threshold value are not used for calculating the correction values.

Further, it is also possible to subject the obtained angular velocity signals to FFT (Fast Fourier Transformation) processing and frequency-analyze the angular velocity signals. In this case, the weight n is reduced as the number of low-frequency components increases. The same holds true for the acceleration signals, and the weight n is reduced as the number of low-frequency components of the acceleration signals increases.

Furthermore, it is also possible that a change in signs between the current values and arbitrary values of the past of the obtained angular velocity values, and a degree thereof are referenced, for example. For example, the more frequently the signs are changed, the closer the currently-set correction values are to the DC offset values of the angular velocity signals, thus resulting in a higher possibility that the input apparatus 1 is in the static state. In other words, it can be judged that only the shake components are being output. In this case, by largely setting the weight n, it becomes possible to carry out highly-accurate calibration processing in a short time.

Instead of or in addition to the output of the angular velocity sensors, output change amounts of the acceleration sensor unit 16 may be referenced in calculating the weight n. The weight n is increased as the obtained acceleration value change amounts become smaller. Also in this case, when a threshold value (second threshold value) is set for the acceleration value change amounts and the acceleration value change amounts are equal to or smaller than the threshold value, the weight n is set larger than that in the case where the acceleration value change amounts are larger than the threshold value. A plurality of threshold values may be set, and the weight n may be determined based on which range of the threshold values the detected acceleration value change amounts belong to.

Here, it is possible that, when the angular velocity value change amounts or the acceleration value change amounts reach a value equal to or larger than a certain set value that is larger than the first and second threshold values, those angular velocity values or the acceleration values are not used for the calibration. This is because the angular velocity signals or the acceleration signals obtained under a condition where the movement of the input apparatus 1 (casing 10) is excessively large are low in reliability such that the values cannot be referenced as the correction values.

The weight n and the count value of the timer described above define the data obtainment period for the calibration. The data obtainment period corresponds to the cutoff frequency of the lowpass filter for extracting the output values of the angular velocity sensors that are to be referenced at the time of the calibration. Therefore, the weight n and the count value of the timer are parameters for determining the cutoff frequency of the lowpass filter.

Next, the obtained angular velocity values ($\omega_\psi$, $\omega_\theta$) are buffered and integrated for each $\omega_\psi$ component and $\omega\theta$ component (Step 1105). In the integration, the current angular velocity values are multiplied by the weight n set as described above. Then, an additionally-prepared counter is incremented only by the weight n in parallel to the integration of the angular velocity values (Step 1105).

Next, it is judged whether the counter value has reached the defined value (Step 1106). When judged that the counter value has not yet reached the defined value, the reference values ($\omega ref_\psi$, $\omega ref_\theta$) read out from the memory are subtracted from the currently-obtained angular velocity values ($\omega_\psi$, $\omega_\theta$), to thus obtain net angular velocity values from which the DC offset components have been removed (Step 1107).

The MPU 19 calculates the pointer velocity values ($V_x$, $V_y$) using an operational method as shown in FIG. 12 based on the thus-obtained angular velocity values, and transmits a movement command (first movement command) to the control apparatus 40 by the same process as in Step 104 shown in FIG. 10 (Step 1108).

While the calibration mode is being executed, the MPU 19 successively obtains the angular velocity values ($\omega_\psi$, $\omega_\theta$), integrates the angular velocity values ($\omega_\psi$, $\omega_\theta$), and repeats the processes described above (Steps 1112 and 1103 to 1108). Then, at the time point when the counter value has reached the defined value, the MPU 19 updates the reference values ($\omega ref_\psi$, $\omega ref_\theta$) for the calibration (Steps 1106 and 1109).

For an update value of the reference values, a value obtained by dividing an integration value of the angular velocity values obtained up to now by the current counter value, that is, a mean value is used. After that, the integration values of the angular velocity values ($\omega_\psi$, $\omega_\theta$) (SUM $\omega_\psi$, SUM $\omega_\theta$) and the counter value are reset to 0 (Step 1110), and the defined value of the counter is set again (Step 1111). The defined value is set with reference to the timer (Step 1101) so that a larger value is set as the lapse time becomes longer (Step 1111). As a result, the data obtainment period is elongated in accordance with the lapse time since the activation of the input apparatus 1. Alternatively, the defined counter value may be fixed after an elapse of a certain time period.

Next, the angular velocity values from which the DC offset components have been removed are obtained by subtracting the new reference values ($\omega ref_\psi$, $\omega ref_\theta$) calculated as described above from the currently-obtained angular velocity values ($\omega_\psi$, $\omega_\theta$) (Step 1107). The updated reference values ($\omega ref_\psi$, $\omega ref_\theta$) of the angular velocities are values calculated based on the past values of the angular velocity values. Specifically, as compared to the case of the reference values (memory values) used for the calibration at an early stage, since the actual angular velocity values are reflected, the calibration processing can be carried out with higher accuracy. In addition, since the calibration degree corresponding to the magnitude of the weight n is reflected, it becomes possible to realize appropriate calibration processing that corresponds to the actual operation of the input apparatus 1.

Furthermore, according to this embodiment, a lowpass filter function with a low cutoff frequency (long sampling time) can be realized while barely taking up space of a buffer memory, with the result that memory-saving of the MPU 19 can be realized.

Upon ending the calibration processing, the offset reference values ($\omega ref_\psi$, $\omega ref_\theta$) obtained most recently are written in the nonvolatile memory (storage section) of the MPU 19 to be referenced as the reference values at the time of the next calibration (Step 1113).

According to the calibration processing example above, appropriate calibration can be carried out even during the operation of the input apparatus 1. Further, the calibration of the angular velocity sensors 151 and 152 can be carried out more readily in the case of moving the input apparatus 1 slowly than in the case of moving the input apparatus 1 speedily. Moreover, even when a drift is caused in the reference potentials of the angular velocity sensors 151 and 152, the activation drift can be converged in a short time, thus making it possible to prevent lowering of operability in moving the pointer 2. The same effect as described above can also be obtained when the angular velocity sensors are calibrated while minutely vibrating the input apparatus 1.

[Third Embodiment]

Next, a third embodiment will be described. It should be noted that the same components as those of the first embodiment above are denoted by the same reference symbols, and descriptions thereof will be omitted.

(Structure of Input Apparatus)

The input apparatus 1 of this embodiment includes the casing 10, the sensor module 17 as the sensor unit, and the MPU 19 as the velocity calculation unit. The sensor module 17 includes the angular velocity sensor unit 15 and the acceleration sensor unit 16 that each output, as a detection signal, a fluctuation of a potential with respect to the reference potential, that corresponds to the movement of the casing 10. As described above, the MPU 19 has a function of executing the first processing mode as processing for calculating the pointer velocity values ($V_x$, $V_y$) that are velocity values for moving the pointer 2 based on the detection signals (output values) of the sensor module 17, and moving the pointer 2 on the screen 3 in accordance with the pointer velocity values.

In addition, the MPU 19 has a function of executing the calibration mode as processing for correcting the reference potential of the sensors (calibration means). The MPU 19 also includes the following function for executing the calibration function.

Specifically, the MPU 19 has a function of judging the operational state of the input apparatus 1 based on the lapse time since the activation of the input apparatus 1 judgment means). The MPU 19 sets the data obtainment period based on the lapse time since the activation of the input apparatus 1 (setting means). The output values of the sensor module 17 obtained over the data obtainment period in time series include the angular velocity values, the acceleration values, and the like of the input apparatus 1 with respect to the X' axis and the Y' axis and are stored in the storage section inside (or outside) the MPU 19. Based on the obtained output values of the sensor module 17, the MPU 19 calculates the correction values for correcting the reference potentials of the angular velocity sensors 151 and 152. The correction value calculation method is not particularly limited, and a moving average, a weighted average, or the like of the output values is used, for example.

Figure 21:
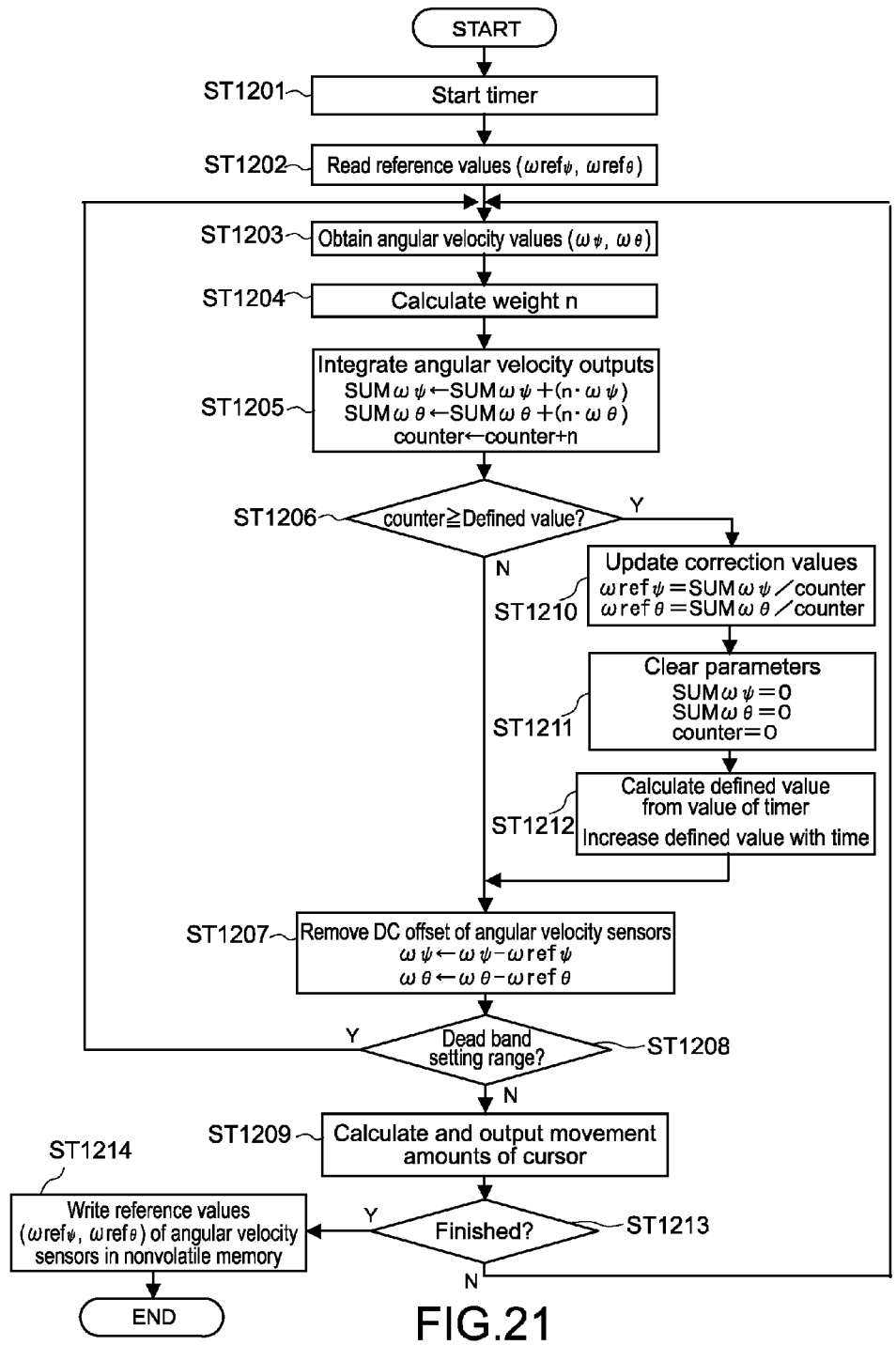
FIG. 21 is a flowchart for illustrating a processing example of a calibration mode of the input apparatus according to still another embodiment.

FIG. 21 is a flowchart showing a processing example of the calibration mode executed during the operation of the input apparatus 1 in this embodiment. In this embodiment, a description will be given on the processing example in which the data obtainment period for the calibration mode is set based on the lapse time since the activation of the input apparatus 1. In the input apparatus 1 of this embodiment, the operation button 11 may be constituted of the 2-step switch including the first and second switches as shown in FIG. 9, or may be constituted of a 1-step switch different from the 2-step switch, in which the first switch is omitted.

(Processing Example 4 of calibration mode)

The timer is operated as the power of the input apparatus 1 is turned on (Step 1201). The timer times a time since the activation of the input apparatus 1, which is referenced when a parameter (defined counter value) used for updating the correction values is calculated as will be described later (Step 1212). The defined counter value is set so as to gradually increase as time elapses since the activation.

Next, reference values (offset values) ($\omega ref_\psi$, $\omega ref_\theta$) of the angular velocity sensors that are to be the reference for the calibration are read from the nonvolatile memory (storage section) of the MPU 19 (Step 1202). Subsequently, the angular velocity values (angular velocity signals, output values) ($\omega_\psi$, $\omega_\theta$) detected by the angular velocity sensors 151 and 152 are obtained (Step 1203).

Then, the weight n is calculated (Step 1204). The count value of the timer, that is, the lapse time since the activation of the input apparatus 1 is referenced when calculating the weight n. In this embodiment, the weight n decreases as the count value of the timer increases. As will be described later, the data obtainment period becomes shorter as the weight n increases. Therefore, a shortest data obtainment period is set immediately after the activation of the input apparatus 1, and the data obtainment period is gradually elongated along with the elapse of time since the activation of the input apparatus 1.

Next, the obtained angular velocity values ($\omega_\psi$, $\omega_\theta$) are buffered and integrated for each $\omega_\psi$ component and $\omega_\theta$ component (Step 1205). In the integration, the current angular velocity values are multiplied by the weight n set as described above. Then, an additionally-prepared counter is incremented only by the weight n in parallel to the integration of the angular velocity values (Step 1205).

Next, it is judged whether the counter value has reached the defined value (Step 1206). When judged that the counter value has not yet reached the defined value, the reference values ($\omega ref_\psi$, $\omega ref_\theta$) read out from the memory are subtracted from the currently-obtained angular velocity values ($\omega_\psi$, $\omega_\theta$), to thus obtain net angular velocity values from which the DC offset components have been removed (Step 1207).

The MPU 19 calculates the pointer velocity values ($V_x$, $V_y$) using an operational method as shown in FIG. 12 based on the thus-obtained angular velocity values when a difference between the output values of the angular velocity sensors ($\omega_\psi$, $\omega_\theta$) and the correction values of the reference potentials ($\omega ref_\psi$, $\omega ref_\theta$) exceeds a predetermined value (Steps 1208 and 1209), and transmits a movement command (first movement command) to the control apparatus 40 by the same process as in Step 104 shown in FIG. 10 (Step 1209).

On the other hand, when the difference between the output values of the angular velocity sensors ($\omega_\psi$, $\omega_\theta$) and the correction values of the reference potentials ($\omega ref_\psi$, $\omega ref_\theta$) is equal to or smaller than the predetermined value, the MPU 19 does not execute the process of generating a movement command and shifts to Step 1203 (Step 1208). The purpose of this process is to prevent lowering of operability in moving the pointer due to an excessively-strong effect of the activation drift. The setting of a dead band as described above can prevent unintentional operations of the pointer due to the activation drift, thus being particularly effective in a case where the net angular velocity values ($\omega_\psi$, $\omega_\theta$) calculated in Step 1207 are relatively small.

A setting range of the dead band, that is, a magnitude of the predetermined value can be set to an arbitrary value while anticipating the activation drift. Moreover, the correction values of the reference potentials ($\omega ref_\psi$, $\omega ref_\theta$) include, in addition to the reference values that have initially been set at the time of shipment, update values of the correction values calculated in Step 1210.

Normally, immediately after the power of the input apparatus 1 is turned on, a change amount of the offset potential due to the activation drift is relatively large and a temporal change thereof is also large. The magnitude of the activation drift decreases with time, and the temporal change thereof also becomes smaller. In this regard, as will be described later, it is also possible to set the setting range of the dead band so that it becomes smaller with time.

While the calibration mode is being executed, the MPU 19 successively obtains the angular velocity values ($\omega_\psi$, $\omega_\theta$), integrates the angular velocity values ($\omega_\psi$, $\omega_\theta$), and repeats the processes described above (Steps 1213 and 1203 to 1209). Then, at the time point when the counter value has reached the defined value, the MPU 19 updates the reference values ($\omega ref_\psi$, $\omega ref_\theta$) for the calibration (Steps 1206 and 1210).

For an update value of the reference values, a value obtained by dividing an integration value of the angular velocity values obtained up to now by the current counter value, that is, a mean value is used. After that, the integration values of the angular velocity values ($\omega_\psi$, $\omega_\theta$) (SUM $\omega_\psi$, SUM$\omega_\theta$) and the counter value are reset to 0 (Step 1211), and the defined value of the counter is set again (Step 1212). The defined value is set with reference to the timer (Step 1201) so that a larger value is set as the lapse time becomes longer (Step 1212). As a result, the data obtainment period is elongated in accordance with the lapse time since the activation of the input apparatus 1. Alternatively, the defined counter value may be fixed after an elapse of a certain time period.

Next, the angular velocity values from which the DC offset components have been removed are obtained by subtracting the new reference values ($\omega ref_\psi$, $\omega ref_\theta$) calculated as described above from the currently-obtained angular velocity values ($\omega_\psi$, $\omega_\theta$) (Step 1207). The updated reference values ($\omega ref_\psi$, $\omega ref_\theta$) of the angular velocities are values calculated based on the past values of the angular velocity values. Specifically, as compared to the case of the reference values (memory values) used for the calibration at an early stage, since the actual angular velocity values are reflected, the calibration processing can be carried out with higher accuracy. In addition, since the calibration degree corresponding to the magnitude of the weight n is reflected, it becomes possible to realize appropriate calibration processing that corresponds to the actual operation of the input apparatus 1.

Furthermore, according to this embodiment, a lowpass filter function with a low cutoff frequency (long sampling time) can be realized while barely taking up space of a buffer memory, with the result that memory-saving of the MPU 19 can be realized.

Upon ending the calibration processing, the offset reference values ($\omega ref_\psi$, $\omega ref_\theta$) obtained most recently are written in the nonvolatile memory (storage section) of the MPU 19 to be referenced as the reference values at the time of the next calibration (Step 1214).

According to the calibration processing example above, appropriate calibration can be carried out even during the operation of the input apparatus 1. Further, by setting a dead band, lowering of operability due to the activation drift immediately after the activation of the input apparatus 1 can be prevented and the activation drift can be converged in a short time.

Furthermore, by setting the setting range of the dead band to become smaller as time elapses since the activation of the input apparatus 1, lowering of operability due to the setting of the dead band can be prevented.

Figure 22A:
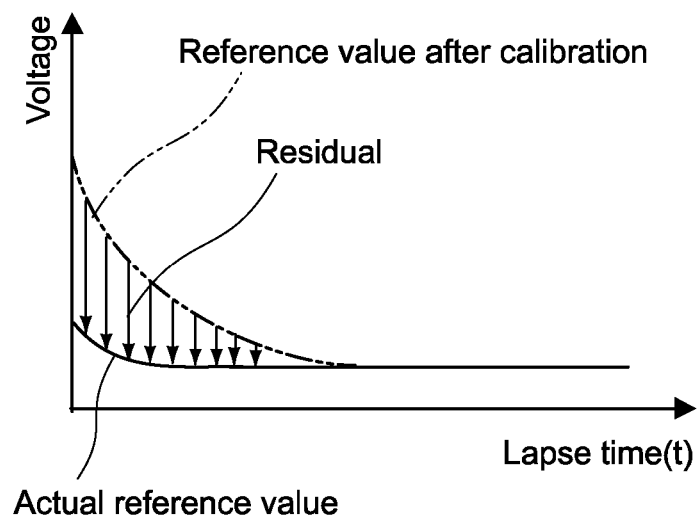
FIG. 22 are diagrams for illustrating examples of a temporal change of a residual of a correction value and a dead band setting pattern, in the processing example of the calibration mode shown in FIG. 21.

Specifically, immediately after the activation of the input apparatus 1, time change rates of the offset potentials of the angular velocity sensors are large and the weight n indicating the calibration degree is set to a small value (short data obtainment period). Therefore, calibration accuracy is relatively low. Thus, the post-calibration reference values (offset potentials) calculated based on the output values of the angular velocity sensors are largely deviated from the actual reference values (large residual). On the other hand, since the activation drift tends to be reduced and converged to a certain value as time elapses and the value of the weight n increases with time (data obtainment period is elongated), calibration accuracy is improved. Therefore, as schematically shown in FIG. 22A, the difference between the post-calibration reference values and the actual reference values becomes smaller with time.

Figure 22B:
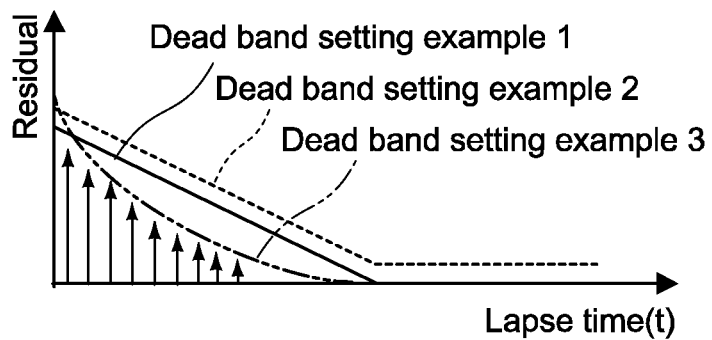

In this regard, as shown in FIG. 22B, the setting range of the dead band is reduced with time, following the temporal change of the calibration residual. Accordingly, lowering of operability of the input apparatus for the user can be prevented. In FIG. 22B, dead band setting examples 1 and 2 show examples where the setting range of the dead band is reduced linear-functionally along with time. It is possible to eventually eliminate the dead band as in the setting example 1, but it is also possible to maintain a constant minimum value without eliminating the dead band as in the setting example 2 for cutting minute noises of the angular velocity sensors. It should be noted that instead of being reduced linear-functionally, the dead band may be reduced in a curve-like manner as shown in a setting example 3.

The setting of the dead band and the variable control of the dead band above can be similarly applied to the first and second embodiments above. Accordingly, operability of the input apparatus 1 can be additionally improved.

Heretofore, the embodiments have been described. However, the present application is not limited to the above embodiments, and various modifications may of course be added without departing from the gist.

In the above embodiments, the pointer 2 that moves on the screen in accordance with the movement of the input apparatus has been represented as an image of an arrow. However, the image of the pointer 2 is not limited to the arrow and may be a simple circle, square, or the like, or a character image or any other images.

In the above embodiments, the input apparatus that generates, as the control command for controlling the screen, the movement command for moving the pointer on the screen has been exemplified. However, the present application is not limited thereto and is also applicable to an input apparatus that generates a control command for controlling zoom or scroll of the displayed screen.

In the first embodiment above, the 2-step switch (operation button 11) for switching the mode of the input apparatus 1 between the pointer movable mode and the pointer immovable mode has been used. Instead of the 2-step switch, a switch means obtained by combining a 1-step pressing switch (determination button) and an optical sensor may be used as the selection means. In this case, the MPU 19 (processing means) executes the "pointer movable mode" when it is detected by the optical sensor that the user's finger is close to or touching the pressing switch, and executes the "pointer immovable mode" when the user's finger is not detected by the optical sensor.

The example in which the lowpass filter is used has been described as the processing example of the calibration mode described with reference to FIG. 15. In this case, Kalman filter or other filter means may be used in place of the lowpass filter.

Furthermore, the calibration flow shown in FIG. 17 has been described as the processing example of the third calibration mode executed when it is detected that the casing 10 is in the static state. However, the calibration flow shown in FIG. 19 or 20 may be used instead. In this case, a maximum value can be used for the weight n calculated in Step 904 or 1104, for example. This is because, as compared to the case where the input apparatus 1 is in a dynamic state, reliability of the obtained angular velocity values is higher and calibration of higher accuracy can thus be executed.

The input apparatus according to the above embodiments has transmitted input information to the control apparatus wirelessly. However, the input information may be transmitted by wire.

The present application may be applied to, for example, a handheld-type electronic apparatus or information processing apparatus (handheld apparatus) including a display section. In other words, the handheld apparatus can be considered as an apparatus in which the input apparatus 1 and the control apparatus 40 are integrated. In this case, by the user moving a main body of the hand-held apparatus, a pointer on a screen displayed on the display section is moved, or the screen is scrolled or zoomed in/out. Examples of the handheld apparatus include a PDA (Personal Digital Assistance), a cellular phone, a portable music player, and a digital camera.

The detection axes of each of the angular velocity sensor unit 15 and the acceleration sensor unit 16 of the sensor module 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

The detection axes (X' axis and Y' axis) of the angular velocity sensor unit 15 and the detection axes (X' axis and Y' axis) of the acceleration sensor unit 16 of the sensor module 17 described in the above embodiments do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

Instead of the angular velocity sensor unit 15, an angle sensor or an angular acceleration sensor may be used. Examples of the angle sensor include a geomagnetic sensor and an image sensor. When triaxial geomagnetic sensors are used, for example, since change amounts of angle values are detected, angular velocity values can be calculated by differentiating the angle values. The angular acceleration sensor is The application is claimed as follows:

1. An input apparatus, comprising:
   an output section including an angular velocity sensor for outputting a reference potential and a fluctuation of a potential with respect to the reference potential, that corresponds to a movement of the input apparatus;
   a processing section for executing processing for generating a control command for controlling a screen based on an output value of the output section;
   a judgment section for judging an operational state of the input apparatus; and
   a calibration section for:
   executing, when it is judged by the judgment section that the operational state of the input apparatus is at least one of a movement state and an immovable state, a calibration mode as processing for correcting the reference potential of the angular velocity sensor by:
   responsive to determining the input apparatus is in the movement state, selecting a first cutoff frequency corresponding to a relative longer data obtainment period,
   responsive to determining the input apparatus is in the immoveable state, selecting a second cutoff frequency corresponding to a relative shorter data obtainment period, and
   obtaining the output value from the angular velocity sensor over the selected data obtainment period that is a sampling period of the output value,
   calculating a correction value of the reference potential by determining a DC component of the obtained output value from the angular velocity sensor to update the reference potential using the calculated correction value, and
   carrying out processing for canceling the fluctuation of the reference potential by subtracting the correction value from the obtained output value from the angular velocity sensor.

2. The input apparatus according to claim 1, further comprising
   a setting section for setting the calibration mode executed by the calibration section based on the operational state of the input apparatus judged by the judgment section.

3. The input apparatus according to claim 2,
   wherein the setting section sets the data obtainment period of the calibration mode based on the operational state of the input apparatus judged by the judgment section.

4. The input apparatus according to claim 2,
   wherein the judgment section judges the operational state of the input apparatus based on the output value.

5. The input apparatus according to claim 4,
   wherein the setting section sets a shorter time period for the data obtainment period as the output value becomes smaller.

6. The input apparatus according to claim 4,
   wherein the calibration section does not execute the calibration mode when a change amount of the output value exceeds a predetermined threshold value.

7. The input apparatus according to claim 4,
   wherein the angular velocity sensor is configured to detect an angular velocity that acts on the input apparatus,
   wherein the judgment section judges the operational state of the input apparatus based on an output value of the angular velocity sensor, and
   wherein the calibration section corrects a reference potential of the angular velocity sensor using the output value of the angular velocity sensor obtained over the data obtainment period.

8. The input apparatus according to claim 7,
   wherein the calibration section includes a lowpass filter to extract a signal of a predetermined frequency band from a detection signal of the angular velocity sensor, and
   wherein the data obtainment period is set based on a cutoff frequency of the lowpass filter.

9. The input apparatus according to claim 4,
   wherein the output section includes an acceleration sensor to detect an acceleration that acts on the input apparatus,
   wherein the judgment section judges the operational state of the input apparatus based on an output value of the acceleration sensor, and
   wherein the calibration section corrects a reference potential of the angular velocity sensor using an output value of the angular velocity sensor obtained over the data obtainment period.

10. The input apparatus according to claim 2,
    wherein the judgment section judges the operational state of the input apparatus based on a lapse time since an activation of the input apparatus.

11. The input apparatus according to claim 10,
    wherein the setting section sets a longer time period for the data obtainment period depending on the lapse time since the activation of the input apparatus.

12. The input apparatus according to claim 10,
    wherein the processing section executes processing in which the generation of the control command is stopped when a difference between the output value of the output section and the correction value of the reference potential is equal to or smaller than a predetermined value.

13. The input apparatus according to claim 12,
    wherein the processing section decrements the predetermined value every time the reference potential is corrected.

14. The input apparatus according to claim 2,
    wherein the processing section includes a first processing mode as processing for generating the control command for controlling the screen based on the output value of the output section, and a second processing mode as processing in which the control of the screen is stopped, and
    wherein the judgment section judges that the operational state is a screen-controlled state when the processing section is executing the first processing mode, and judges that the operational state is a screen-uncontrolled state when the processing section is executing the second processing mode.

15. The input apparatus according to claim 14,
    wherein the setting section sets a first time period for the data obtainment period when the judgment section judges that the operational state is the screen-controlled state, and sets a second time period shorter than the first time period for the data obtainment period when the judgment section judges that the operational state is the screen-uncontrolled state.

16. The input apparatus according to claim 14, further comprising
a selection switch for causing the processing section to select one of the first processing mode and the second processing mode.

17. The input apparatus according to claim 15,
wherein the setting section includes processing for changing the second time period in accordance with a magnitude of the output value.

18. A control system, comprising:
an input apparatus including
an output section including an angular velocity sensor for outputting a reference potential and a fluctuation of a potential with respect to the reference potential, that corresponds to a movement of the input apparatus;
a processing section for executing processing for generating a control command for controlling a screen based on an output value of the output section,
a transmission section for transmitting the control command generated by the processing section,
a judgment section for judging an operational state of the input apparatus, and
a calibration section for:
executing, when it is judged by the judgment section that the operational state of the input apparatus is at least one of a movement state and an immovable state, a calibration mode as processing for correcting the reference potential of the angular velocity sensor by:
responsive to determining the input apparatus is in the movement state, determining a first cutoff frequency corresponding to a relative longer data obtainment period,
responsive to determining the input apparatus is in the immoveable state, determining a second cutoff frequency corresponding to a relative shorter data obtainment period, and
obtaining the output value from the angular velocity sensor over the determined data obtainment period that is a sampling period of the output value,
calculating a correction value of the reference potential by determining a DC component of the obtained output value from the angular velocity sensor to update the reference potential using the calculated correction value, and
carrying out processing for canceling the fluctuation of the reference potential by subtracting the correction value from the obtained output value from the angular velocity sensor; and
a control apparatus including
a reception section for receiving the control command transmitted by the transmission section, and
a display control section for controlling display of the screen in response to the control command received by the reception section.

19. A handheld apparatus, comprising:
a casing;
a display section;
an output section including an angular velocity sensor for outputting a reference potential and a fluctuation of a potential with respect to the reference potential, that corresponds to a movement of the casing;
a processing section for executing processing for generating a control command for controlling a screen displayed on the display section based on an output value of the output section;
a judgment section for judging an operational state of the handheld apparatus; and
a calibration section for:
executing, when it is judged by the judgment section that the operational state of the handheld apparatus is a movement state or an immovable state, a calibration mode as processing for correcting the reference potential of the angular velocity sensor by:
responsive to determining the handheld apparatus is in the movement state, selecting a relative long data obtainment period,
responsive to determining the input apparatus is in the immoveable state, selecting a relative short data obtainment period, and
obtaining the output value from the angular velocity sensor over the selected data obtainment period that is a sampling period of the output value,
calculating a correction value of the reference potential by determining a DC component of the obtained output value from the angular velocity sensor to update the reference potential using the calculated correction value, and
carrying out processing for canceling the fluctuation of the reference potential by subtracting the correction value from the obtained output value from the angular velocity sensor.

20. A calibration method, comprising:
outputting by an output section that includes an angular velocity sensor, as a detection signal, a fluctuation of a potential with respect to a reference potential, that corresponds to a movement of an electronic apparatus;
judging an operational state of the electronic apparatus;
responsive to determining the operational state of the electronic apparatus is a movement state, selecting a relative longer data obtainment period;
responsive to determining the operational state of the electronic apparatus is an immoveable state, selecting a relative shorter data obtainment period;
obtaining, when it is judged that the operational state of the electronic apparatus is a movement state, an output value of the detection signal from the angular velocity sensor over the relatively longer data obtainment period that is a sampling period of the output value;
calculating a correction value of the reference potential by determining a DC component of the obtained output value from the angular velocity sensor;
carrying out processing for canceling the fluctuation of the reference potential by subtracting the correction value from the obtained output value from the angular velocity sensor; and
updating the reference potential using the calculated correction value.

21. The input apparatus according to claim 1, further comprising a casing.

22. The control section according to claim 18, further comprising a casing configured to enclose the input apparatus.

* * * * *